United States Patent
Hubbard et al.

(10) Patent No.: US 11,087,410 B2
(45) Date of Patent: Aug. 10, 2021

(54) METHODS, SYSTEMS AND COMPUTER PROGRAM PRODUCTS FOR FACILITATING USER INTERACTION WITH TAX RETURN PREPARATION PROGRAMS

(71) Applicant: INTUIT INC., Mountain View, CA (US)

(72) Inventors: Paul F. Hubbard, San Diego, CA (US); Tyler Thomas Krupicka, Newberg, OR (US); Andrew Scott Jeddeloh, Beaverton, OR (US); Nankun Huang, San Diego, CA (US); Amir R. Eftekhari, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1263 days.

(21) Appl. No.: 15/143,551

(22) Filed: Apr. 30, 2016

(65) Prior Publication Data
US 2017/0316513 A1 Nov. 2, 2017

(51) Int. Cl.
*G06Q 40/00* (2012.01)
(52) U.S. Cl.
CPC .................................. *G06Q 40/123* (2013.12)
(58) Field of Classification Search
CPC .............................. G06Q 40/123; G06Q 40/00
See application file for complete search history.

(56) References Cited

U.S. PATENT DOCUMENTS

| | | | |
|---|---|---|---|
| 8,082,144 B1 | 12/2011 | Brown et al. | |
| 8,108,258 B1* | 1/2012 | Slattery | G06Q 20/207 |
| | | | 705/19 |
| 8,589,262 B1* | 11/2013 | Wang | G06F 17/27 |
| | | | 382/137 |

(Continued)

FOREIGN PATENT DOCUMENTS

KR     10-2013-0027811 A     3/2013

OTHER PUBLICATIONS

Lewis et al., A Clarification Algorithm for Spoken Language Dialogue Systems, 2005, AT&T Labs—Research, pp. 34-40 (Year: 2005).*

(Continued)

*Primary Examiner* — Kenneth Bartley
(74) *Attorney, Agent, or Firm* — DLA Piper LLP (US)

(57) ABSTRACT

A system for facilitating user interaction with a tax return preparation program includes a completion graph parser configured to identify a portion of a tax return completion graph corresponding to a tax topic. The system also includes a query object creator configured to analyze and assign a node in the portion as a query object property. The system further includes a natural language synthesis engine configured to map the property to a first natural language question. Moreover, the system includes a natural language analysis engine configured to analyze user input and to identify a characteristic that maps to the property based on the user input. In addition, the system includes a runner interface configured to modify the query object based on the charac- (Continued)

teristic, update the tax return completion graph based on the modified query object, and analyze the updated tax return completion graph to determine whether it is complete.

27 Claims, 27 Drawing Sheets

(56) References Cited

U.S. PATENT DOCUMENTS

| | | | |
|---|---|---|---|
| 9,477,588 B2* | 10/2016 | Pliss | G06F 12/023 |
| 9,736,088 B1* | 8/2017 | Bueker | H04L 51/02 |
| 2001/0032076 A1* | 10/2001 | Kursh | G06Q 40/02 |
| | | | 704/257 |
| 2006/0126620 A1* | 6/2006 | Bonar | G06F 8/35 |
| | | | 370/389 |
| 2006/0167931 A1* | 7/2006 | Bobick | G06N 5/022 |
| 2008/0016040 A1* | 1/2008 | Jones | G06F 17/3064 |
| 2012/0109792 A1 | 5/2012 | Eftekhari et al. | |
| 2012/0136863 A1* | 5/2012 | Bobick | G06N 5/022 |
| | | | 707/737 |
| 2013/0282539 A1 | 10/2013 | Murray | |
| 2014/0279971 A1* | 9/2014 | Bobick | G06N 5/022 |
| | | | 707/693 |
| 2015/0019566 A1* | 1/2015 | Jones | G06F 17/3064 |
| | | | 707/748 |
| 2016/0078567 A1 | 3/2016 | Goldman et al. | |
| 2017/0310613 A1* | 10/2017 | Lalji | H04L 51/02 |
| 2017/0316513 A1* | 11/2017 | Hubbard | G06Q 40/123 |
| 2018/0131644 A1* | 5/2018 | Bueker | H04L 51/02 |

OTHER PUBLICATIONS

PCT International Search Report for PCT/US2016/044470, Applicant: Intuit Inc., Form PCT/ISA/210 and 220, dated Jan. 26, 2017 (5pages).

PCT Written Opinion of the International Search Authority for PCT/US2016/044470, Applicant: Intuit Inc., Form PCT/ISA/237, dated Jan. 26, 2017 (5pages).

* cited by examiner

| | $Q_A$ | $Q_B$ | $Q_C$ | $Q_D$ | $Q_E$ | $Q_F$ | $Q_G$ | Goal |
|---|---|---|---|---|---|---|---|---|
| Rule1 | Y | ? | N | ? | ? | ? | ? | Yes |
| Rule2 | Y | ? | Y | ? | ? | ? | Y | Yes |
| Rule3 | N | Y | ? | ? | Y | ? | Y | Yes |
| Rule4 | N | Y | ? | ? | N | N | ? | Yes |
| Rule5 | N | N | ? | N | ? | N | ? | Yes |

FIG. 13

METHODS, SYSTEMS AND COMPUTER PROGRAM PRODUCTS FOR FACILITATING USER INTERACTION WITH TAX RETURN PREPARATION PROGRAMS

SUMMARY

Embodiments are directed to systems, computer-implemented methods, and computer program products for facilitating user interaction with tax return preparation programs.

In one embodiment directed to a system for facilitating user interaction with a tax return preparation program, the system includes a completion graph parser configured to identify a portion of a tax return completion graph, where the portion of the tax return completion graph corresponds to a tax topic. The system also includes a query object creator configured to analyze a node in the portion of the tax return completion graph and to assign the node as a first property of a query object. The system further includes a natural language synthesis engine configured to map the first property of the query object to a first natural language question. Moreover, the system includes a natural language analysis engine configured to analyze user input and to identify a characteristic that maps to the first property of the query object based on the user input. In addition, the system includes a runner interface configured to modify the query object based on the characteristic, update the tax return completion graph based on the modified query object, and analyze the updated tax return completion graph to determine whether the updated tax return completion graph is complete.

In another embodiment directed to a computer-implemented method for facilitating user interaction with a tax return preparation program, the method includes identifying a portion of a tax return completion graph, where the portion of the tax return completion graph corresponds to a tax topic. The method also includes analyzing a node in the portion of the tax return completion graph. The method further includes assigning the node as a first property of a query object. Moreover, the method includes mapping the first property of the query object to a first natural language question. In addition, the method includes communicating the first natural language question to a user. The method also includes receiving user input from the user in response to communicating the first natural language question. The method further includes analyzing the user input to identify a characteristic that maps to the first property of the query object based on the user input. Moreover, the method includes modifying the query object based on the characteristic. In addition, the method includes updating the tax return completion graph based on the modified query object. The method also includes analyzing the updated tax return completion graph to determine whether the updated tax return completion graph is complete.

In still another embodiment directed to a computer program product including a non-transitory computer readable storage medium embodying one or more instructions executable by a computer system to perform a process for facilitating user interaction with a tax return preparation program, the process includes identifying a portion of a tax return completion graph, where the portion of the tax return completion graph corresponds to a tax topic, analyzing a node in the portion of the tax return completion graph, assigning the node as a first property of a query object, mapping the first property of the query object to a first natural language question, communicating the first natural language question to a user, receiving user input from the user in response to communicating the first natural language question, analyzing the user input to identify a characteristic that maps to the first property of the query object based on the user input, modifying the query object based on the characteristic, updating the tax return completion graph based on the modified query object, and analyzing the updated tax return completion graph to determine whether the updated tax return completion graph is complete.

In one or more embodiments, the completion graph parser is configured to reformat the tax return completion graph. The completion graph parser may be configured to assign a default value to another portion of the tax return completion graph not corresponding to the tax topic.

In one or more embodiments, the query object creator is configured to analyze a plurality of nodes of the tax return completion graph, the plurality of nodes including the node, and to assign each node of the plurality of nodes as a respective property of the query object. In one or more embodiments, the first property of the query object must be determined to answer a question related to the tax topic.

In one or more embodiments, the natural language synthesis engine is configured to generate the first natural language question based on the first property of the query object. The first natural language question may have been previously generated.

In one or more embodiments, the user interface is a voice user interface and/or a graphic user interface.

In one or more embodiments, the natural language analysis engine includes a natural language construct. The natural language construct may be selected from the group consisting of an equivalent sentence structure, a synonym, and an antonym. The natural language analysis engine may be configured to analyze the user input using the natural language construct.

In one or more embodiments, the runner interface is configured to analyze the updated tax return completion graph to determine whether the updated tax return completion graph is complete in response to the natural language analysis engine identifying the characteristic that maps to the first property of the query object. The runner interface may be configured to instruct the natural language synthesis engine to map a result of the updated tax return completion graph to a natural language statement when the runner interface determines the updated tax return completion graph is complete. The runner interface may be configured to instruct the user interface to communicate the natural language statement to the user when the runner interface determines the updated tax return completion graph is complete.

In one or more embodiments, the runner interface is configured to instruct the query object creator to generate a second property of the query object based on the node, and instruct the natural language synthesis engine to map the second property of the query object to a second natural language question when the runner interface determines the updated tax return completion graph is incomplete. The runner interface may be configured to instruct the user interface to communicate the second natural language question to the user when the runner interface determines the updated tax return completion graph is incomplete.

In one or more embodiments, the system also includes a user interface configured to communicate the first natural language question to a user and to receive the user input from the user in response to communicating the first natural language question.

In one or more embodiments, the method also includes reformatting the tax return completion graph. The method may also include assigning a default value to another portion of the tax return completion graph not corresponding to the tax topic. The method may also include analyzing a plurality of nodes of the portion of the tax return completion graph, the plurality of nodes including the node, and assigning each node of the plurality of nodes as a respective property of the query object. The method may also include generating the first natural language question based on the first property of the query object. The method may also include analyzing the user input using a natural language construct. The natural language construct may be selected from the group consisting of an equivalent sentence structure, a synonym, and an antonym.

In one or more embodiments, the method also includes analyzing the updated tax return completion graph to determine whether the updated tax return completion graph is complete in response to identifying the characteristic that maps to the first property of the query object. The method may also include mapping a result of the updated tax return completion graph to a natural language statement when it is determined that the updated tax return completion graph is complete. The method may also include communicating the natural language statement to the user when it is determined that the updated tax return completion graph is complete. The method may also include generating a second property of the query object based on the node, and mapping the second property of the query object to a second natural language question when it is determined that the updated tax return completion graph is incomplete. The method may also include communicating the second natural language question to the user when it is determined that the updated tax return completion graph is incomplete.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 13 illustrates a decision table based on or derived from the completion graph of FIG. 12.

Figure 1:
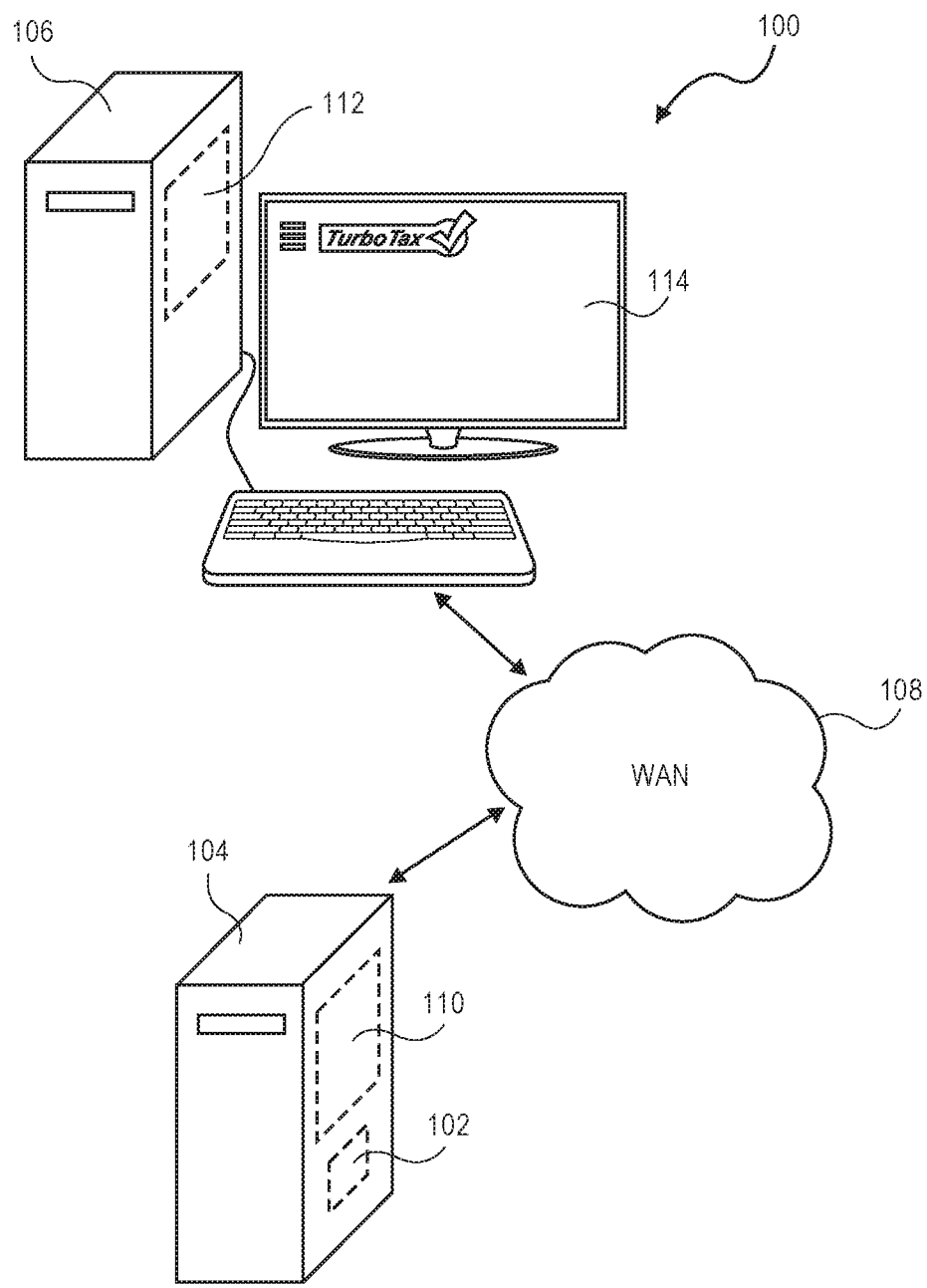
FIGS. 1 to 6 are schematic diagrams illustrating the implementation of virtual tax agent systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments describe methods, systems and articles of manufacture for facilitating user interaction with tax return preparation programs. In particular, the embodiments describe using completion graphs, query objects, and natural language engines to implement a tax knowledge based virtual agent ("tax knowledge virtual agent" or "virtual tax agent") to facilitate user interaction during tax return preparation. The tax knowledge virtual agent facilitates user interactions to obtain tax information to prepare tax returns.

Virtual agents are artificial intelligence powered computer software that can assist human users in repetitive tasks. Virtual agents, such as APPLE's SIRI, MICROSOFT's CORTANA and AMAZON's ALEXA, are increasingly common software user interfaces. Such virtual agents may improve the user experience by providing a more natural interaction between a human user and a third party principal (e.g., a business) represented by the virtual agent while minimizing, or in some cases eliminating, input from a human customer service representative. Virtual agents may also improve the user experience because they are often less variable compared to human customer service representatives. Virtual agents may further improve the user experience by directing the limited resources of human customer service representatives to scenarios where the virtual agents are not able to answer a user's questions, thus better utilizing the human customer service representatives' creativity. Virtual agents can also store and process more data than human customer service representatives in less time.

Current virtual agents are tasked based, in that they are programmed to assist the human user with a particular task. Programming current virtual agents to handle complicated tasks, such as tax return preparation, involves exhaustive enumeration of an exponential amount of use cases, which can be tedious and time-consuming. Further, changes in tax laws and rules can require a significant amount of time and effort to revise each use case. Virtual agents for complicated tasks (e.g., tax return preparation) must navigate a large body of knowledge (e.g., tax knowledge) to answer even a subset of the questions that a human user may ask the virtual agent.

The embodiments described herein implement a tax knowledge virtual agent. In one embodiment, the tax knowledge virtual agent accesses a tax return completion graph. A completion graph parser identifies a portion of the tax return completion graph corresponding to a tax topic. Then, a query object creator analyzes a node in the identified portion of the tax return completion graph, and assigns the node as a property of a query object. Next, a natural language synthesis engine maps the property of the query object to a natural language question. Then, a user interface communicates the natural language question to a user and receives input from the user in response to the natural language question. Next, a natural language analysis engine analyzes the user input and identifies a user characteristic that maps to the first property of the query object based on the user input. Then, a runner interface modifies the query object based on the user characteristic, updates the tax return completion graph based on the modified query object, and analyzes the updated tax return completion graph to determine whether it is complete.

Tax knowledge virtual agents that modify tax return completion graphs using natural language questions and inputs are more robust and flexible than task based virtual agents. As such, tax knowledge virtual agents can facilitate communication between users and third party principals relating to the complicated task of tax return preparation. Further, tax knowledge virtual agents implemented with tax return completion graphs can be modified with less time and effort to reflect changes in tax laws and regulations.

The embodiments described herein address the computer-specific problem of implementing a virtual tax agent for tax return preparation. The embodiments described herein also transform natural language input into modified query objects and updated completion graphs to facilitate interactions between a user and a third party. Moreover, the embodiments described herein improve a computer's function, e.g., by providing a more natural and efficient user interface.

As used in this application, a "user," "preparer" or "taxpayer" includes, but is not limited to, a person preparing a tax return using tax return preparation software. The "user," "preparer" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's income tax burden, including but not limited to, information typically included in a tax return. The term "tax data," as used in this application, also includes, but is not limited to, partially or fully completed tax forms (electronic, hard copy and images thereof) that include information typically included in a tax return. As used in this application, "tax document" includes, but is not limited to, physical documents containing tax data, and images thereof.

As used in this application, "financial management program" or "financial management system" includes, but is not limited to, software that oversees and governs an entity's income, expenses, and assets. An exemplary financial management system is MINT Financial Management Software, which is available from Intuit Inc. of Mountain View, Calif. A financial management system is executed to assist a user with managing its finances. Financial management systems manage financial transaction data from financial transaction generators such as accounts including checking, savings, money market, credit card, stock, loan, mortgage, payroll or other types of account. Such financial transaction generators can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, Microsoft Money Financial Management Software and YODLEE Financial Management Software (available from Yodlee, Inc. of Redwood City, Calif.).

As used in this application, "computer," "computer device," or "computing device" includes, but is not limited to, a computer (stationary/desktop or portable/laptop) and a computer or computing device of a handheld mobile communication device, smartphone and tablet computing device such as an IPHONE or an IPAD (available from Apple Inc. of Cupertino, Calif.). As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" includes, but is not limited to, one or more separate and independent software and/or hardware components of a computer that must be added to a general purpose computer before the computer can prepare tax returns, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data or hardware and software resources among the other computers and software, and computers having such components added thereto. As used in this application, "mobile computer" or "handheld computer" includes, but is not limited to, computers configured (e.g., having a form factor) to be held in a hand of a user during the normal course of use. As used in this application, "stationary computer" includes, but is not limited to, computers configured (e.g., having a form factor) to be stationary relative to a user during the normal course of use. As used in this application, "mobile application" includes, but is not limited to, one or more separate and independent software components of a computer that must be added to a general purpose handheld computer before the handheld computer can run the mobile application.

As used in this application, "user data computer" and "user data program" include, but are not limited to, one or more separate and independent software and/or hardware components of a computer that must be added to a general purpose computer before the computer can receive, generate, store and transmit user data to other computers and software, and computers having such components added thereto.

As used in this application, "input/output module" includes, but is not limited to, one or more separate and independent software and/or hardware components of a computer that must be added to a general purpose computer before the computer can communicate with and facilitate the receipt and transfer of information, including but not limited to, natural language questions, statements and user input, from and to other computers. As used in this application, "memory module" includes, but is not limited to, one or more separate and independent software and/or hardware components of a computer that must be added to a general purpose computer before the computer can store information, including but not limited to, natural language questions, statements and user input.

As used in this application, "completion graph parser" or "tax completion graph parser" includes, but is not limited to, one or more separate and independent software and/or hardware components of a computer that must be added to a general purpose computer before the computer can identify a portion of a tax return completion graph corresponding to a tax topic. As used in this application, "query object creator" includes, but is not limited to, one or more separate and independent software and/or hardware components of a computer that must be added to a general purpose computer before the computer can analyze a node in a portion of a tax return completion graph and assign the node as a property of a query object. As used in this application, "natural language synthesis engine" includes, but is not limited to, one or more separate and independent software and/or hardware components of a computer that must be added to a general purpose computer before the computer can map a property of the query object to a natural language question. As used in this application, "user interface" includes, but is not limited to, one or more separate and independent software and/or hardware components of a computer that must be added to a general purpose computer before the computer can communicate with a user. As used in this application, "natural language analysis engine" includes, but is not limited to, one or more separate and independent software and/or hardware components of a computer that must be added to a general purpose computer before the computer can analyze user input and identify a characteristic that maps to a property of a query object based on the user input. As used in this application, "runner interface" includes, but is not limited to, one or more separate and independent software and/or hardware components of a computer that must be added to a general purpose computer before the computer can modify a query object based on a characteristic, update a tax return completion graph based on the modified query object, or analyze the updated tax return completion graph to determine whether the updated tax return completion graph is complete.

As used in this application, "speech processor" includes, but is not limited to, one or more separate and independent software and/or hardware components of a computer that must be added to a general purpose computer before the computer can synthesize speech.

As used in this application, "website" includes, but is not limited to, one or more operatively coupled webpages. As used in this application, "browser," "web browser," "browser program," "web browser program," "browser application" or "web browser application" includes, but is not limited to, one or more separate and independent software and/or hardware components of a computer that must be added to a general purpose computer before the computer can receive, display and transmit resources from/to the World Wide Web. As used in this application, "synthesized speech" includes, but is not limited to, artificially produced human speech.

FIG. 1 depicts an exemplary hardware system 100 on which a virtual tax agent system/program 102 according to one embodiment can be executed. The hardware system 100 according to this embodiment includes a server computing device 104 and a user computing device 106, which are operatively coupled via a network 108. The server computing device 104 is a stationary computer. The user computing device 106 is a stationary or desktop computer. The network 108 may be two or more networks depending on the system configuration and communication protocols employed. One or more or all of networks 108 may be, for example, a wireless or cellular network, a private communication network (e.g., mobile phone network), a Local Area Network (LAN) and/or a Wide Area Network (WAN). Reference to network 108 generally is not intended to refer to a specific network or communications protocol, and embodiments can be implemented using various networks 108 and combinations thereof.

In the embodiment depicted in FIG. 1, the virtual tax agent system 102 and an operatively coupled electronic tax return preparation system/program 110 both run on the server computing device 104. Examples of tax return preparation systems 110 that may be operatively coupled to the virtual tax agent system 102 include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif. A web browser program 112 runs on the user computer and accesses the virtual tax agent system 102 and the tax return preparation system 110 through the network 108.

The various computing devices 104, 106 may include visual displays or screens 114 operatively coupled thereto. In the embodiment depicted in FIG. 1, the user computing device 106 includes a display or screen 114 through which a user physically interfaces with the user computing device 106 and the web browser program 112 running thereon.

Figure 2:
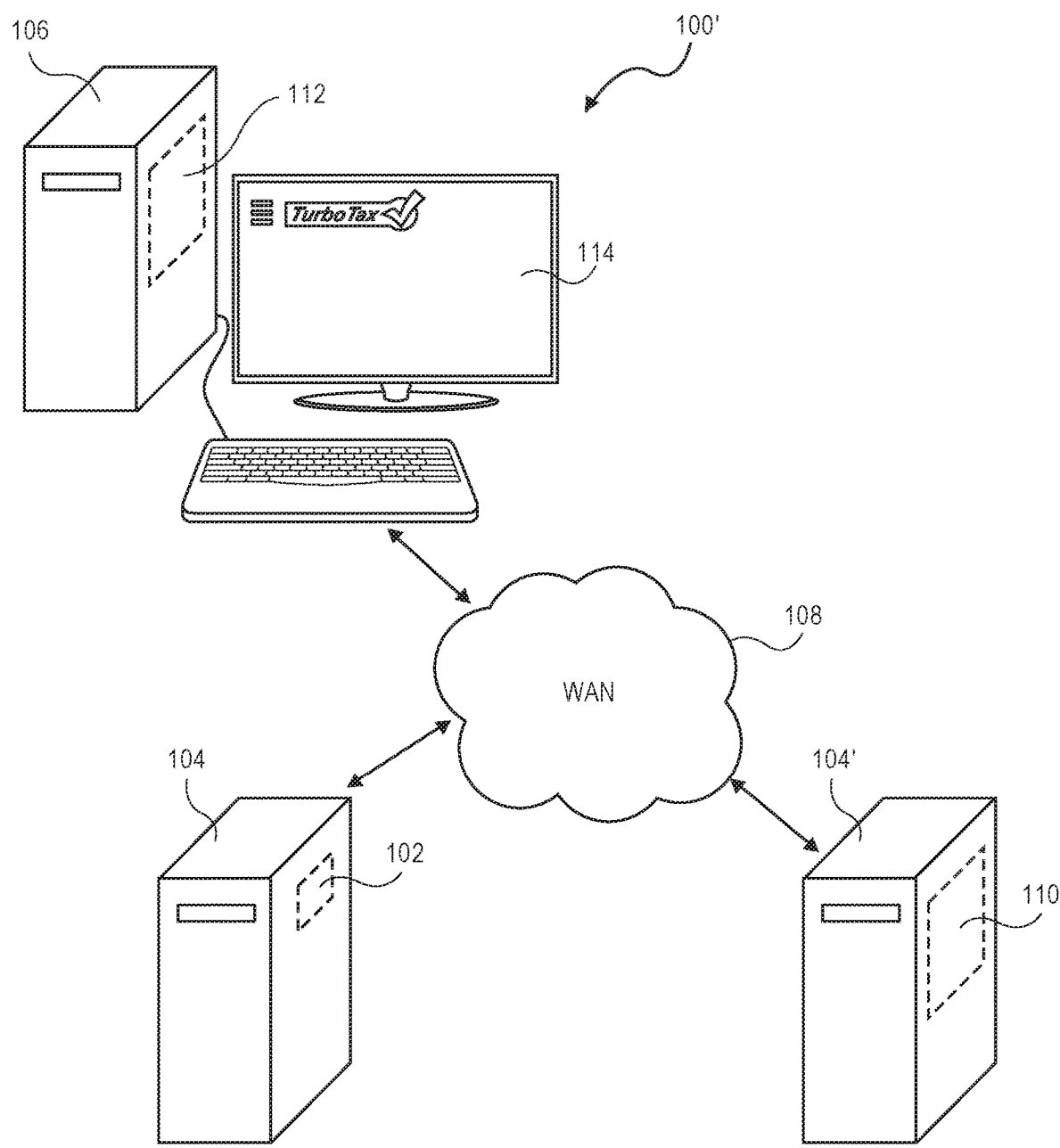

While the virtual tax agent system 102 and the tax return preparation system 110 in FIG. 1 are depicted as running on the same server computing device 104, in other embodiments, these systems 102, 110 can run on separate computing devices. For instance, FIG. 2 depicts another exemplary hardware system 100' on which a virtual tax agent system 102 can be executed. The hardware system 100' depicted in FIG. 2 is similar to the hardware system 100 depicted in FIG. 1. However, in addition to the server computing device 104 and the user computing device 106, the hardware system 100' also includes a second server computing device 104' operatively coupled to the server computing device 104 and user computing device 106 via the network 108. The second server computing device 104' hosts the tax return preparation system 110, while the virtual tax agent system 102 is hosted on the server computing device 104.

Figure 3:
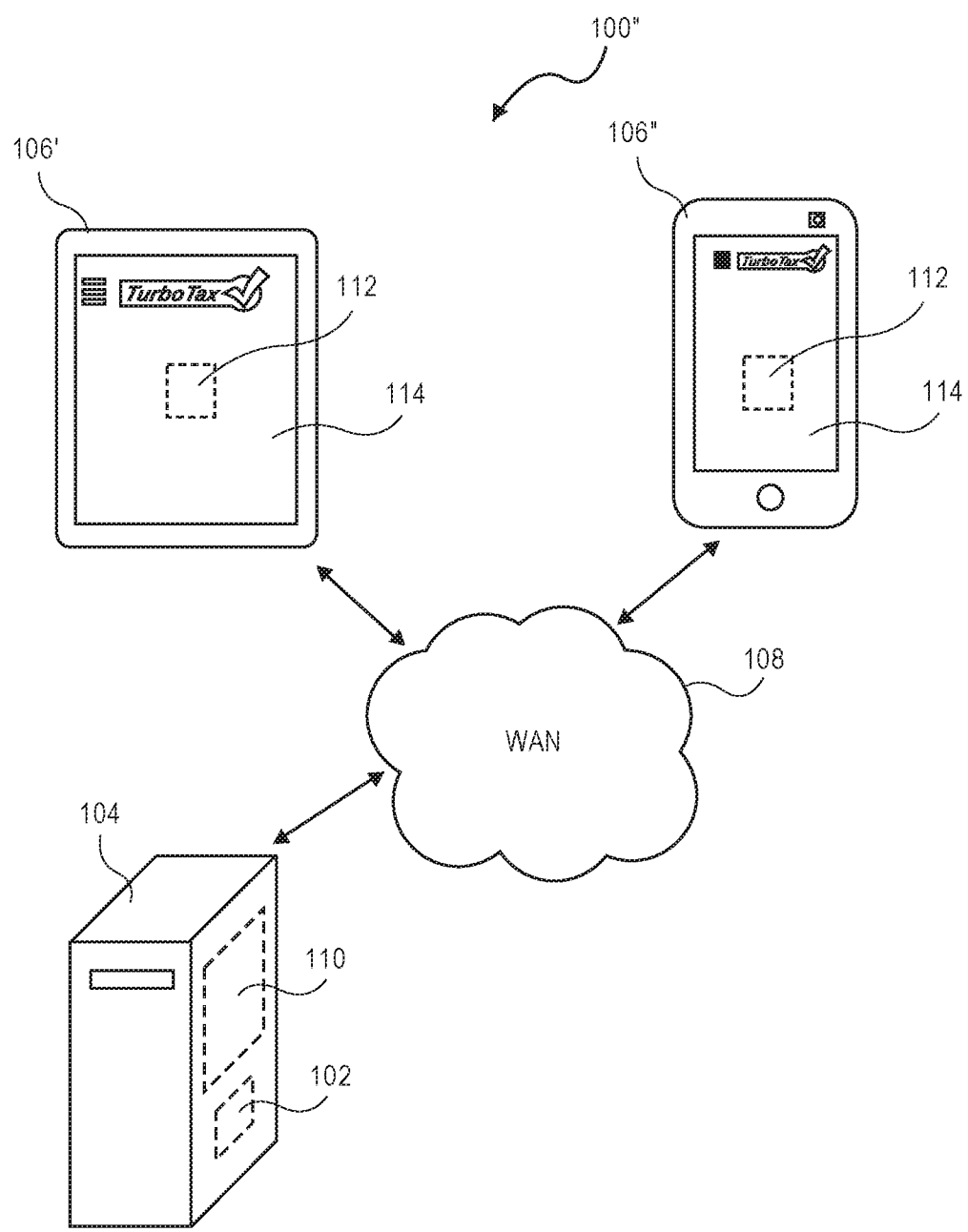

While the user computing device 106 hosting the web browser program 112 in FIG. 1 is depicted as a stationary or desktop computer, in other embodiments, the computing device hosting the web browser program 112 with which the user interacts can be a handheld mobile communication device, such as a smartphone or a tablet computing device. For instance, FIG. 3 depicts still another exemplary hardware system 100" on which a virtual tax agent system 102 can be executed. The hardware system 100" depicted in FIG. 3 is similar to the hardware system 100 depicted in FIG. 1. However, the user computing devices 106', 106" hosting the web browser program 112 with which the user interacts are handheld mobile communication devices. One user computing device 106' is a tablet computing device and the other user computing device 106" is a smartphone. The web browser program 112 running on the handheld mobile user computing devices may be an application or an "app."

Figure 4:
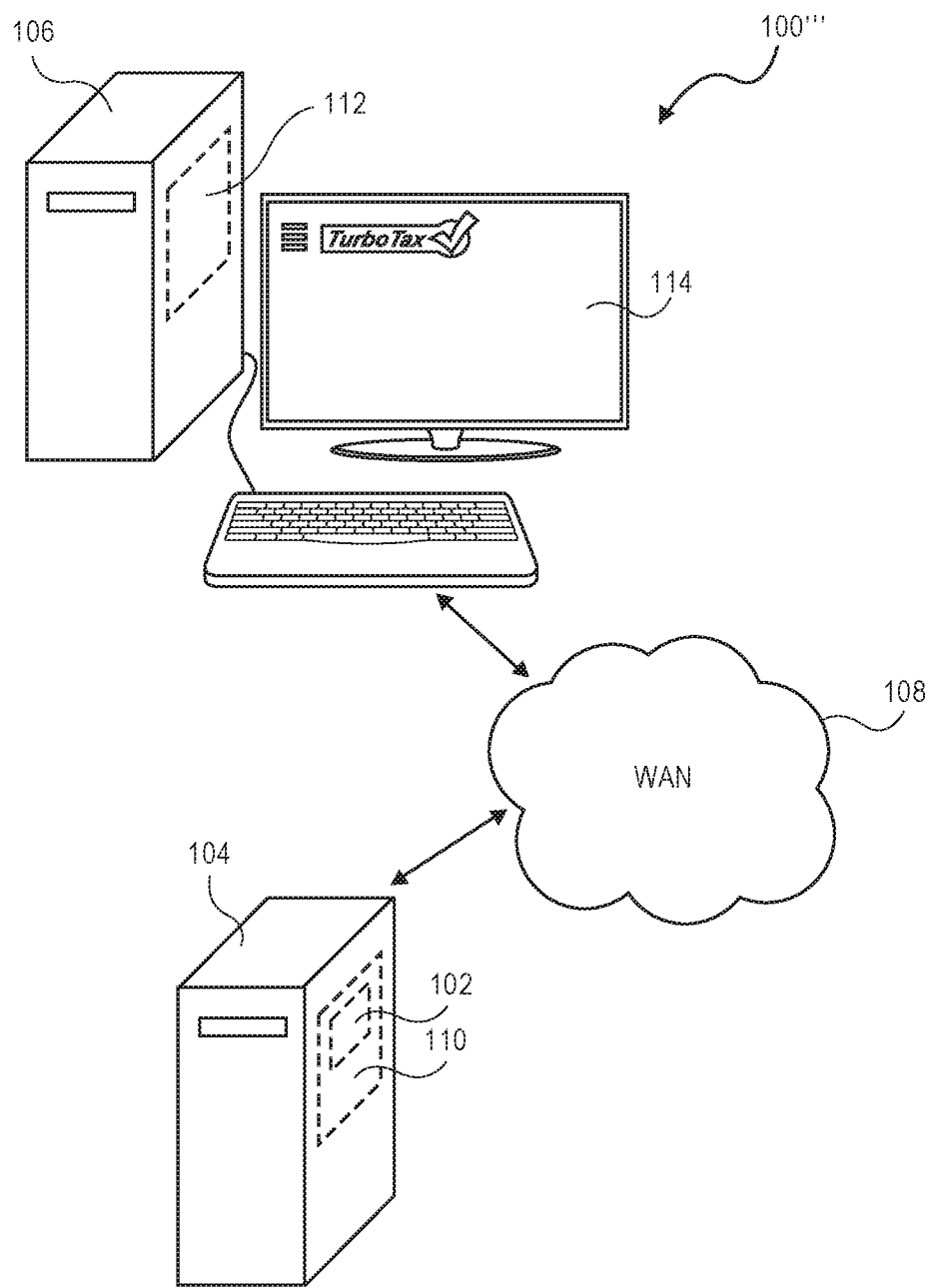

While the virtual tax agent system 102 and the tax return preparation system 110 in FIG. 1 are depicted as separate but operatively coupled systems running on a server computing device 104, in other embodiments, the virtual tax agent system 102 can be part of the tax return preparation system 110. For instance, FIG. 4 depicts another exemplary hardware system 100''' on which a virtual tax agent system 102 can be executed. The hardware system 100''' depicted in FIG. 2 is similar to the hardware system 100 depicted in FIG. 1. However, the virtual tax agent system 102 depicted in FIG. 4 is a part of the tax return preparation system 110.

Figure 5:
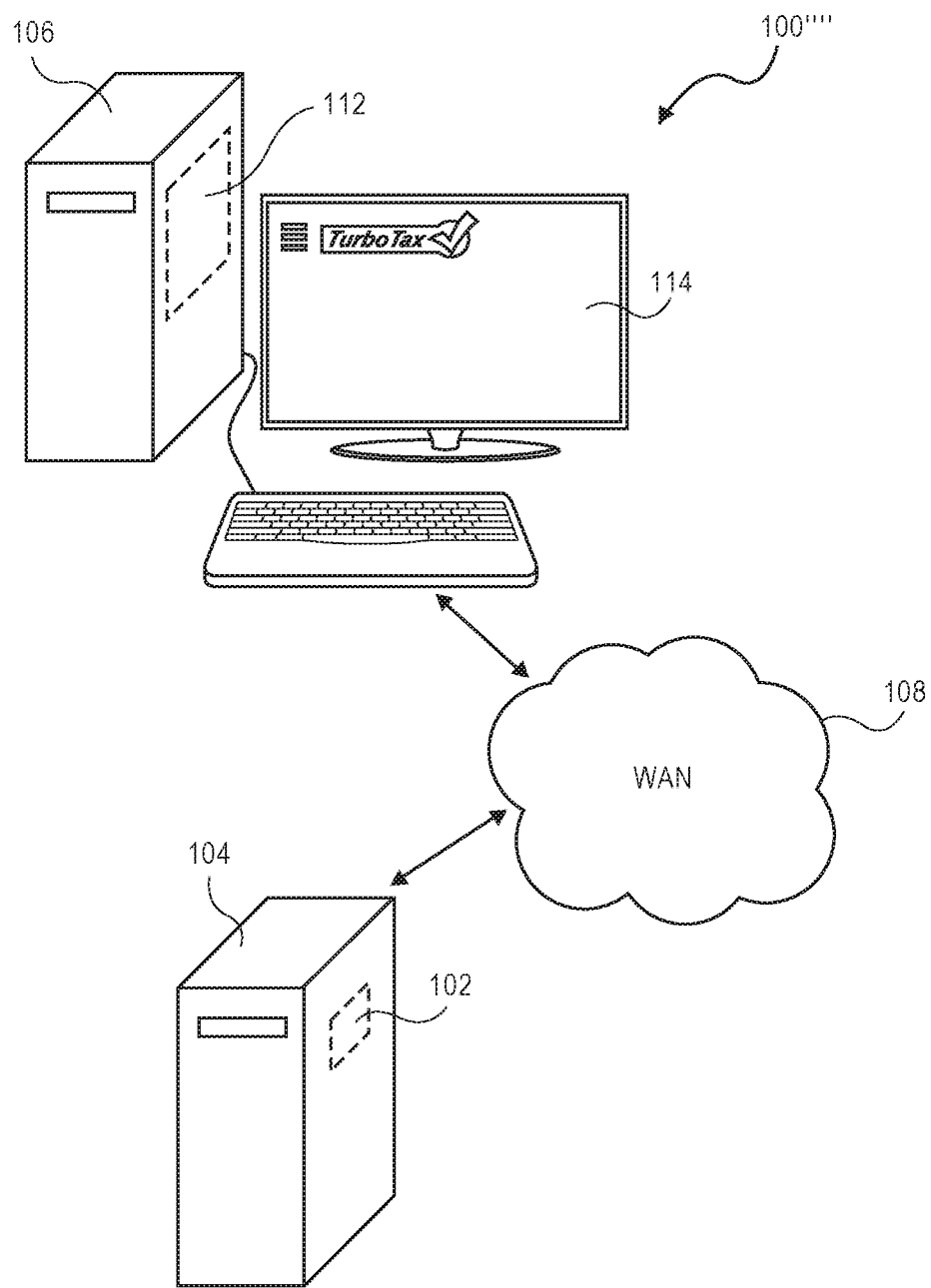
Figure 6:
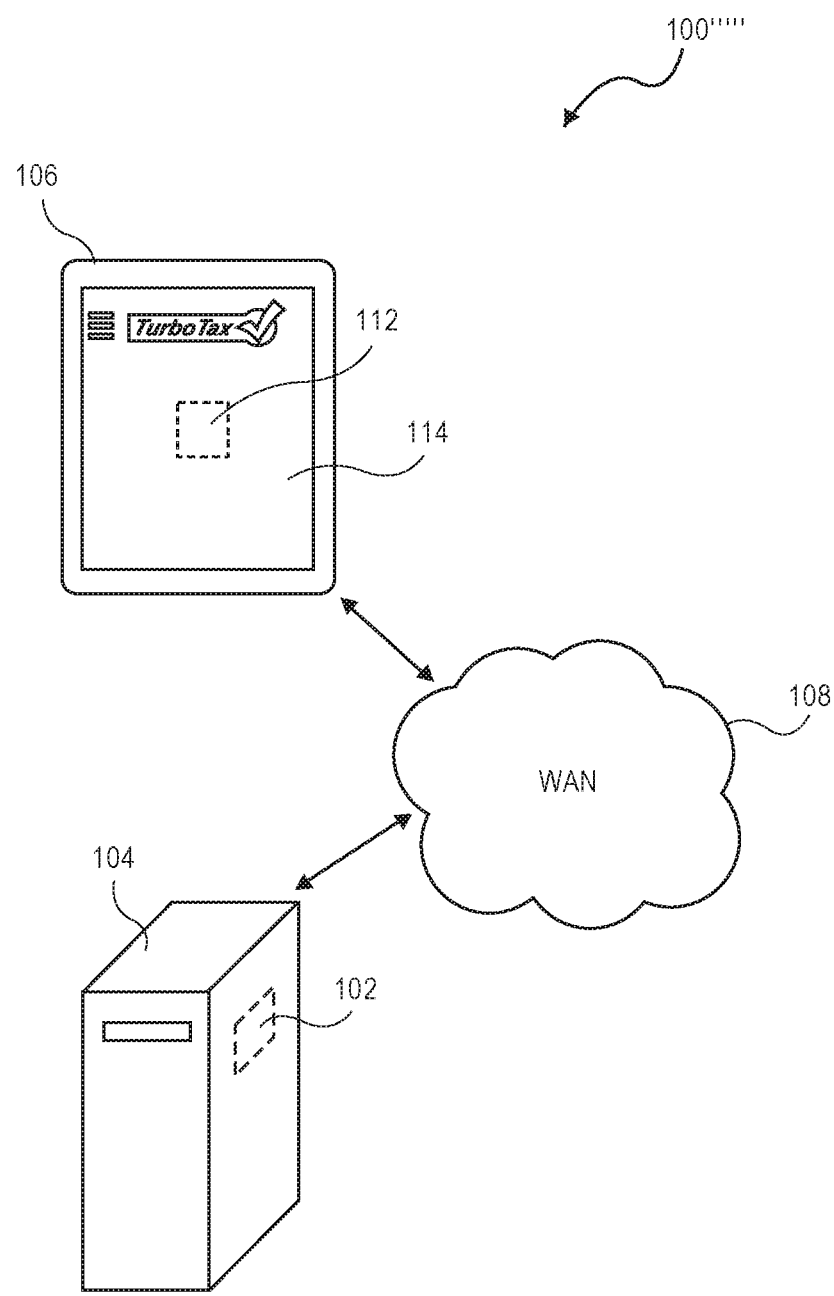

While the tax return preparation system 110 in FIG. 1 is depicted as running on a server computing device 104 and accessed by a browser 112 running a user computing device 106, in other embodiments, these tax return preparation system 110 can run on the user computing device 106. For instance, FIGS. 5 and 6 depict two exemplary hardware systems 100'''', 100''''' on which a virtual tax agent system 102 can be executed. The hardware systems 100'''', 100''''' depicted in FIGS. 5 and 6 are similar to the hardware system 100 depicted in FIG. 1. However, the tax return preparation systems 110 depicted in FIGS. 5 and 6 run directly on respective user computing devices 106, 106'. These tax return preparation systems 110 are operatively coupled to respective virtual tax agent systems 102 running on respective server computing devices 104 through respective networks 108, providing user access to the virtual tax agent systems 102. In these embodiments, no web browser program is needed to access either the tax return preparation systems 110 or the virtual tax agent systems 102. The tax return preparation systems 110 running on the handheld mobile user computing devices may be applications or "apps."

While FIGS. 1 to 6 depict the server computing device 104 and the user computing device(s) 106, 106', 106'' as being operatively coupled by the same network 108, in other embodiments, these computing devices may be operatively coupled by two or more networks.

Figure 7:
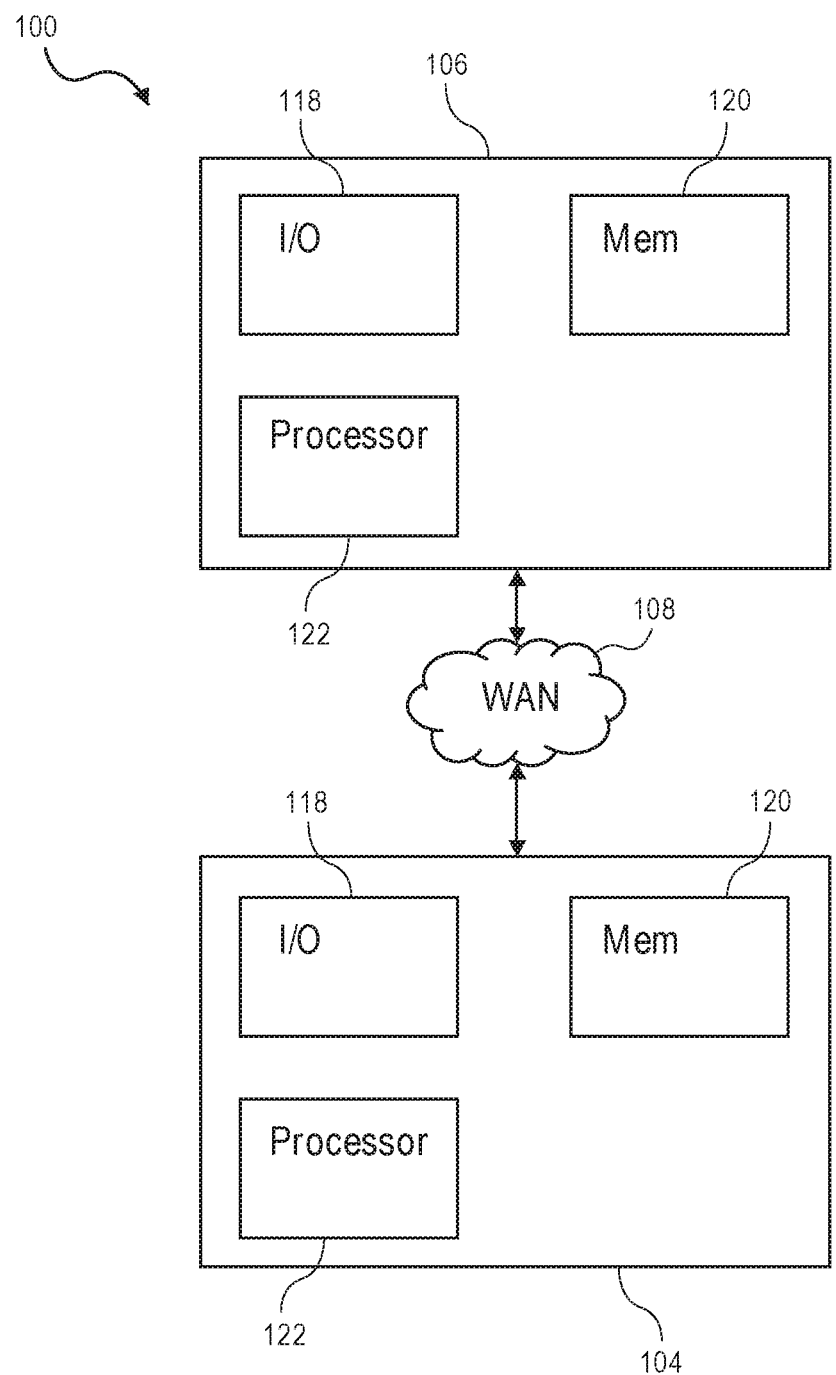
FIGS. 7 and 8 are block diagrams of computer systems according to various embodiments on which virtual tax agent systems according to various embodiments may be implemented.

FIG. 7 depicts, in greater detail, a hardware system 100 configured to host a virtual tax agent system 102 according to one embodiment. Like the hardware systems 100 depicted in FIGS. 1 and 3-6, the hardware system 100 in FIG. 7 includes a server computing device 104 and a user computing device 106 that are operatively coupled by a network 108. The server computing device 104 includes an input/output module 118, a memory module 120 and a processor 122. The user computing device 106 also includes an input/output module 118, a memory module 120 and a processor 122. The input/output modules 118 are configured to communicate with and facilitate the receipt and transfer of data, including natural language questions, statements and user input. The memory modules 120 are configured to store data, including natural language questions, statements and user input, in proper formats for, e.g., facilitating user interaction with tax return preparation programs to obtain tax information to prepare tax returns. The processors 122 in the server computing device 104 and the user computing device 106 are configured to respectively run programs/applications (e.g., virtual tax agent system 102, tax return preparation system 110 and web browser program 112), as shown in FIGS. 1, 3-6.

Figure 8:
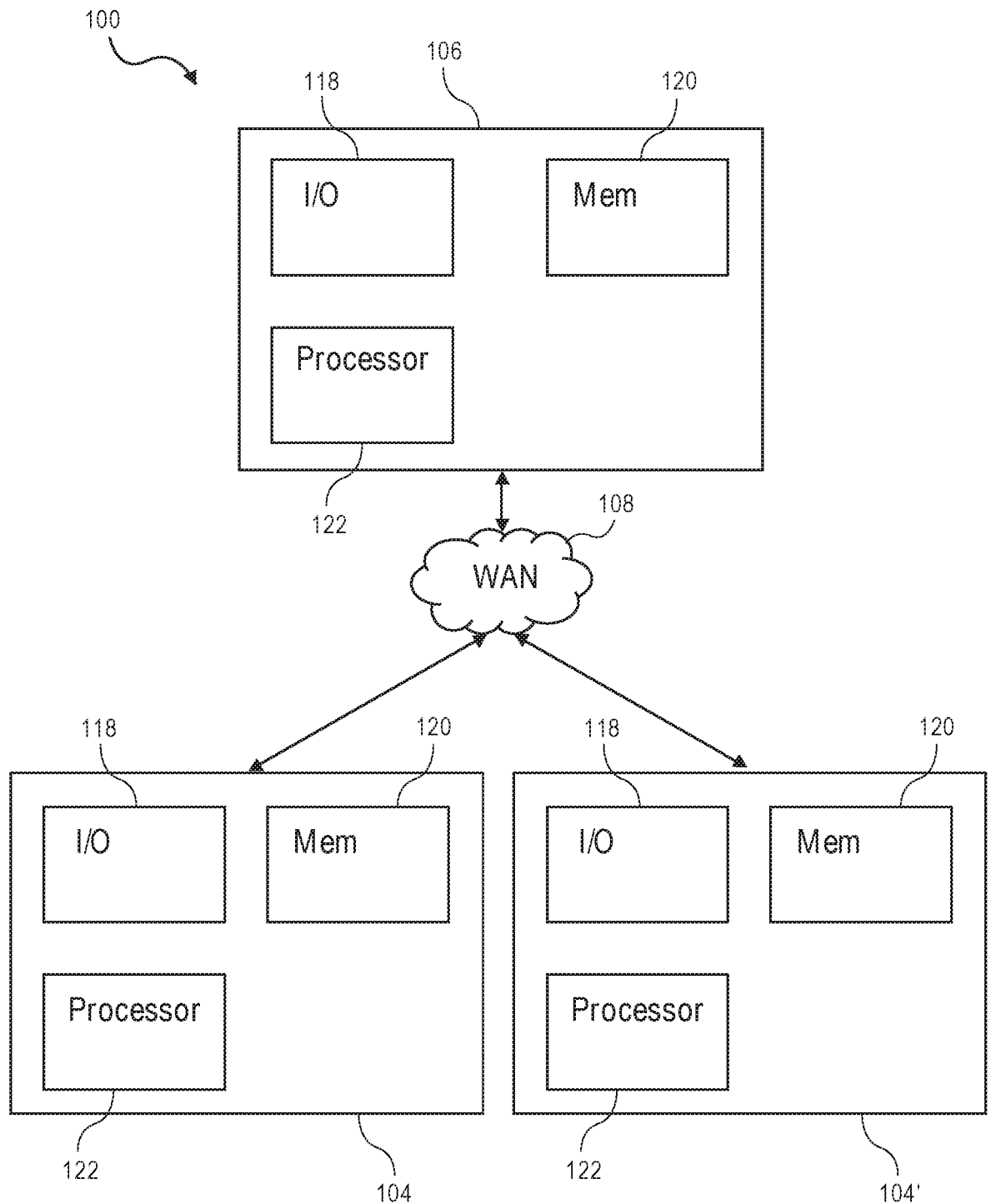

FIG. 8 depicts, in greater detail, another hardware system 100 configured to host a virtual tax agent system 102 according to another embodiment. Like the hardware system 100 depicted in FIG. 2, the hardware system 100 in FIG. 8 includes two server computing devices 104, 104' and a user computing device 106 that are operatively coupled by a network 108. Each server computing device 104, 104' includes an input/output module 118, a memory module 120 and a processor 122, as described above. The user computing device 106 also includes an input/output module 118, a memory module 120 and a processor 122. The processors 122 in the server computing devices 104, 104' and the user computing device 106 are configured to respectively run programs/applications (e.g., virtual tax agent system 102, tax return preparation system 110 and web browser program 112), as shown in FIG. 2.

Figure 9:
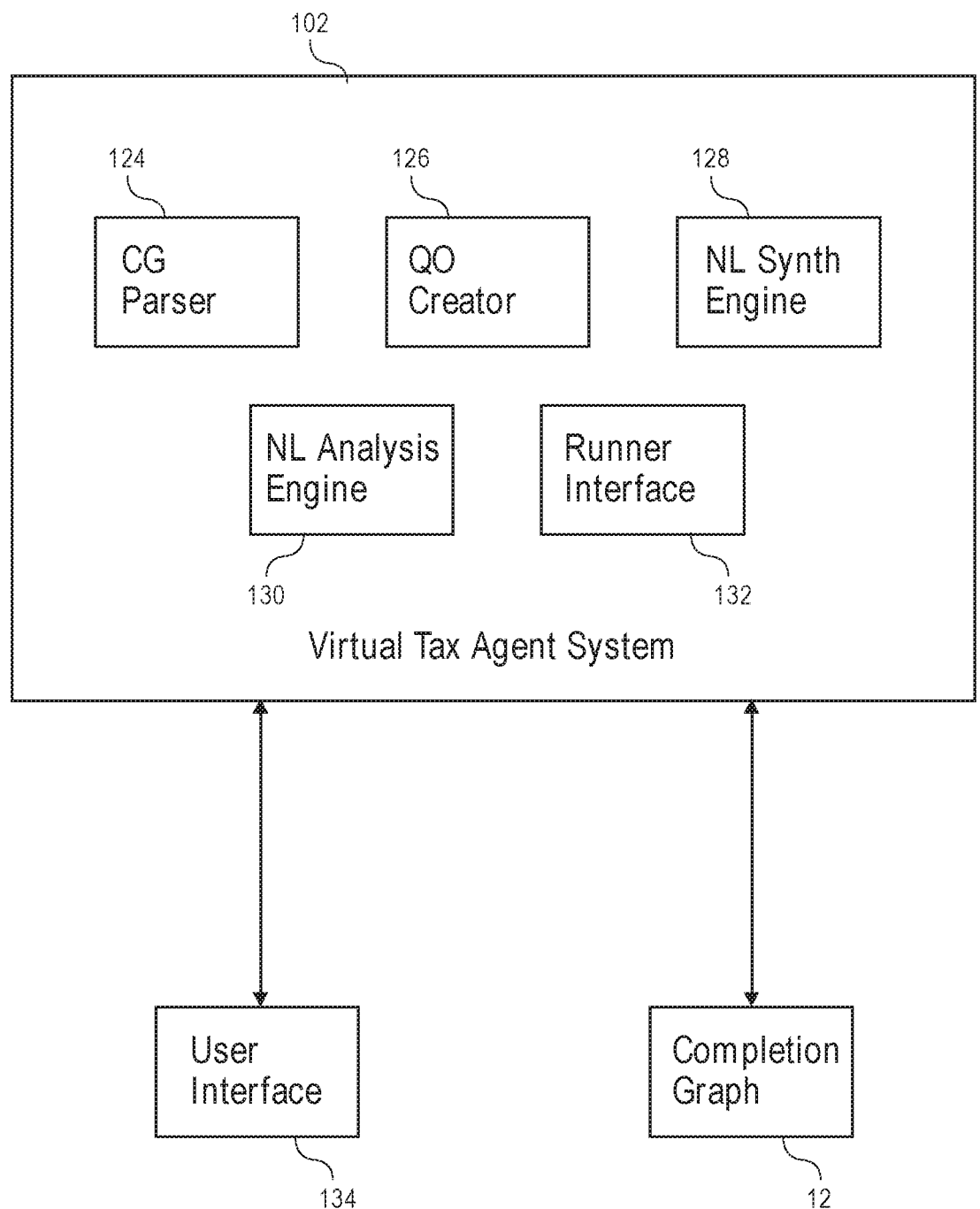
FIG. 9 is a block diagram of a virtual tax agent system according to one embodiment.

FIG. 9 depicts, in greater detail, a virtual tax agent system 102 according to one embodiment. The virtual tax agent system 102 includes a tax completion graph parser 124, a query object creator 126, a natural language synthesis engine 128, a natural language analysis engine 130 and a runner interface 132. All of these components/modules may be operatively/logically connected elements of the virtual tax agent system 102. FIG. 9 also shows that the virtual tax agent system 102 may be operatively coupled to a user interface 134 (e.g., a user interface 134 of a tax return preparation system 110). FIG. 9 further shows that the virtual tax agent system 102 may be operatively coupled to a tax return completion graph 12 (e.g., a tax return completion graph 12 for use by a tax return preparation system 110, as described below). While FIG. 9 depicts the virtual tax agent system 102, the user interface 134 and the tax return completion graph 12 as separate components, in other embodiments, these components may be part of each other. For instance, the user interface 134 and/or the tax return completion graph 12 may be part of the virtual tax agent system 102.

The tax completion graph parser 124 is configured to acquire and analyze user data to identify a portion of a tax return completion graph corresponding to a tax topic. An example of a tax topic is qualification for a dependent deduction. The user data may be a tax return completion graph/completeness graph 12. The tax completion graph parser 124 acquires a tax return completion graph in its native format and transforms the completion graph format into an internal format for processing. The tax completion graph parser 124 can isolate specific parts of the tax return completion graph related to the tax topic by setting other input/outputs to default values. This allows the tax return completion graph to be run with incomplete information.

Examples of tax return completion graphs/completeness graphs (e.g., a tax knowledge engine ("TKE") completion graph) are described in U.S. patent application Ser. No. 14/448,886, the contents of which are fully incorporated herein by reference as though set forth in full. As described in U.S. patent application Ser. No. 14/448,886, a tax return completion graph may be a plurality of decision tables for computing tax liability or a portion thereof using the tax return preparation system 110.

Figure 10:
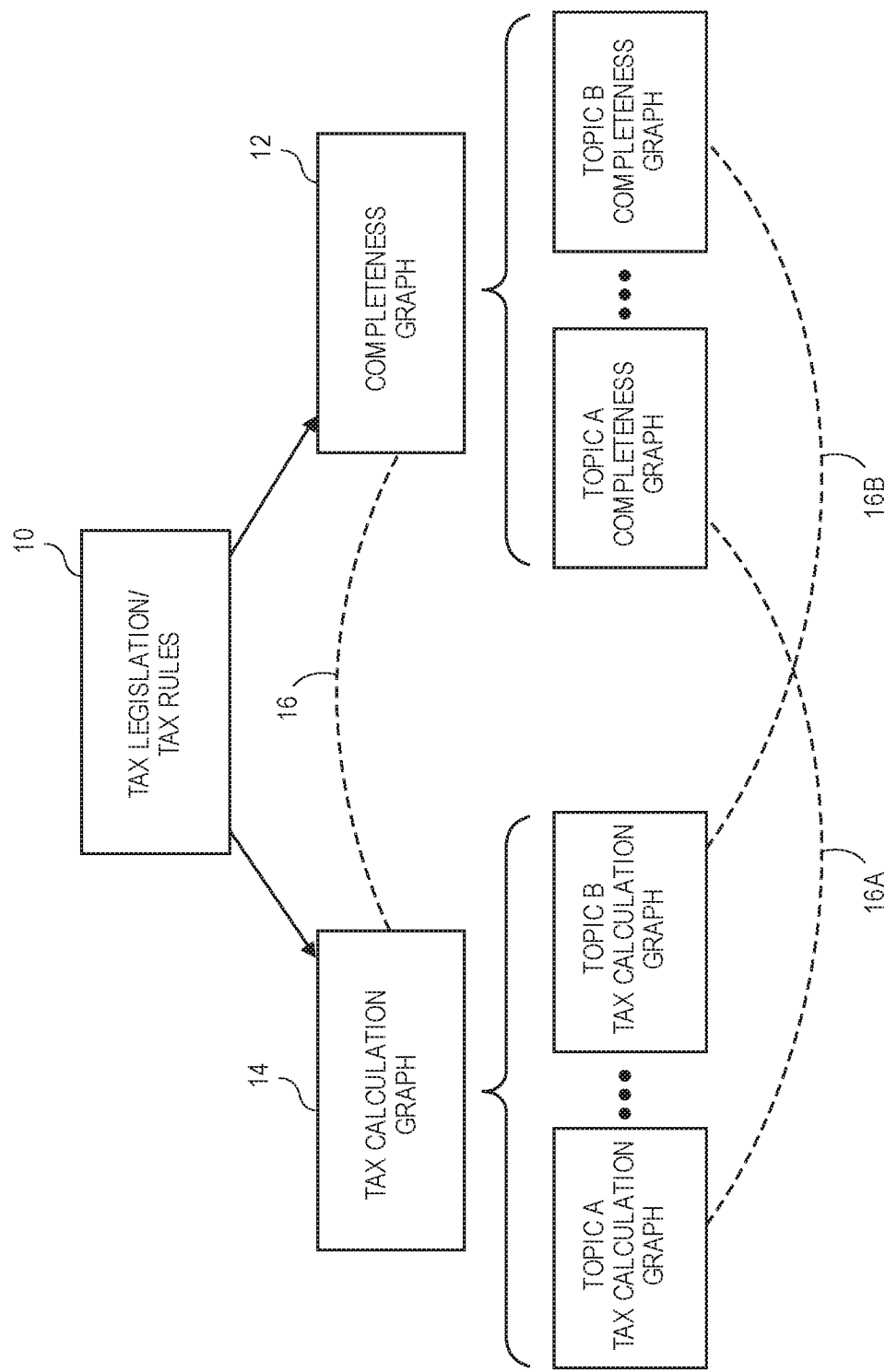
FIG. 10 schematically illustrates how tax legislation/tax rules is/are parsed and represented by a completion graph and a tax calculation graph.

FIG. 10 illustrates graphically how tax legislation/tax rules 10 may be broken down into a completion graph 12 and a tax calculation graph 14 in various tax return preparation systems, such as the one described in U.S. patent application Ser. No. 14/448,886. The tax legislation or rules 10 may be parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, each particular topic (e.g., topics A, B) may each have their own dedicated completion graph 12A, 12B and tax calculation graph 14A, 14B as seen in FIG. 10.

Note that in FIG. 10, the completion graph 12 and the tax calculation graph 14 are interdependent as illustrated by dashed line 16. That is to say, some elements contained within the completion graph 12 are needed to perform actual tax calculations using the tax calculation graph 14. Likewise, aspects within the tax calculation graph 14 may be needed as part of the completion graph 12. Taken collectively, the completion graph 12 and the tax calculation graph 14 may represent data structures that capture all the conditions necessary to complete the computations that are required to complete a tax return that can be filed. The completion graph 12, for example, may determine when all conditions have been satisfied such that a "fileable" tax return can be prepared with the existing data. The completion graph 12 may be used to determine, for example, that no additional data input is needed to prepare and ultimately file a tax return. The completion graph 12 may be used to determine when a particular schema contains sufficient information such a tax return can be prepared and filed. Individual combinations of completeness graphs 12 and tax calculation graphs 14 that relate to one or more topics can be used complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI).

Figure 11:
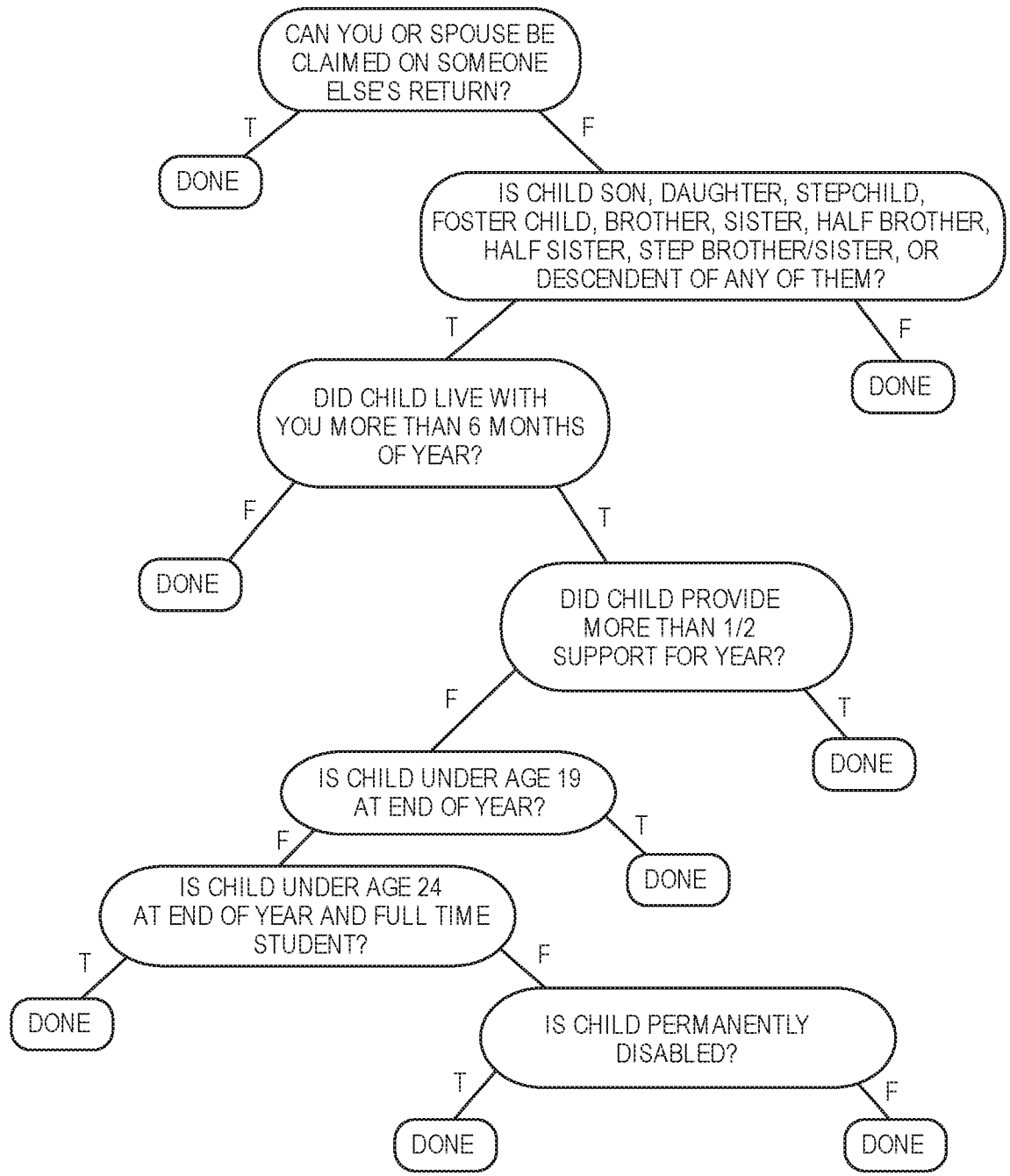
FIG. 11 illustrates an example of a simplified version of a completion graph related to a qualifying child for purposes of determining deductions for federal income tax purposes.

The completion graph 12 and the tax calculation graph 14 represent data structures that can be constructed in the form of a tree. FIG. 11 illustrates a completion graph 12 in the form of a tree with nodes 20 and arcs 22 representing a basic or general version of a completion graph 12 for the topic of determining whether a child qualifies as a dependent for federal income tax purposes. A more complete flow chart-based representation of questions related to determining a "qualified child" may be found in U.S. patent application Ser. No. 14/097,057, the contents of which are fully incorporated herein by reference as though set forth in full. Each node 20 contains a condition that in this example is expressed as a Boolean expression that can be answered in the affirmative or negative. The arcs 22 that connect each node 20 illustrate the dependencies between nodes 20. The combination of arcs 22 in the completion graph 12 illustrates the various pathways to completion. A single arc 22 or combination of arcs 22 that result in a determination of "Done" represent a pathway to completion. As seen in FIG. 11, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completion graph 12 can be ignored, for example, when certain questions internal to the completion graph 12 are answered that eliminate other nodes 20 and arcs 22 within the completion graph 12. The dependent logic expressed by the completion graph 12 allows one to minimize subsequent questions based on answers given to prior questions. This allows a minimum question set that can be generated that can be presented to a user as explained herein.

Figure 12:
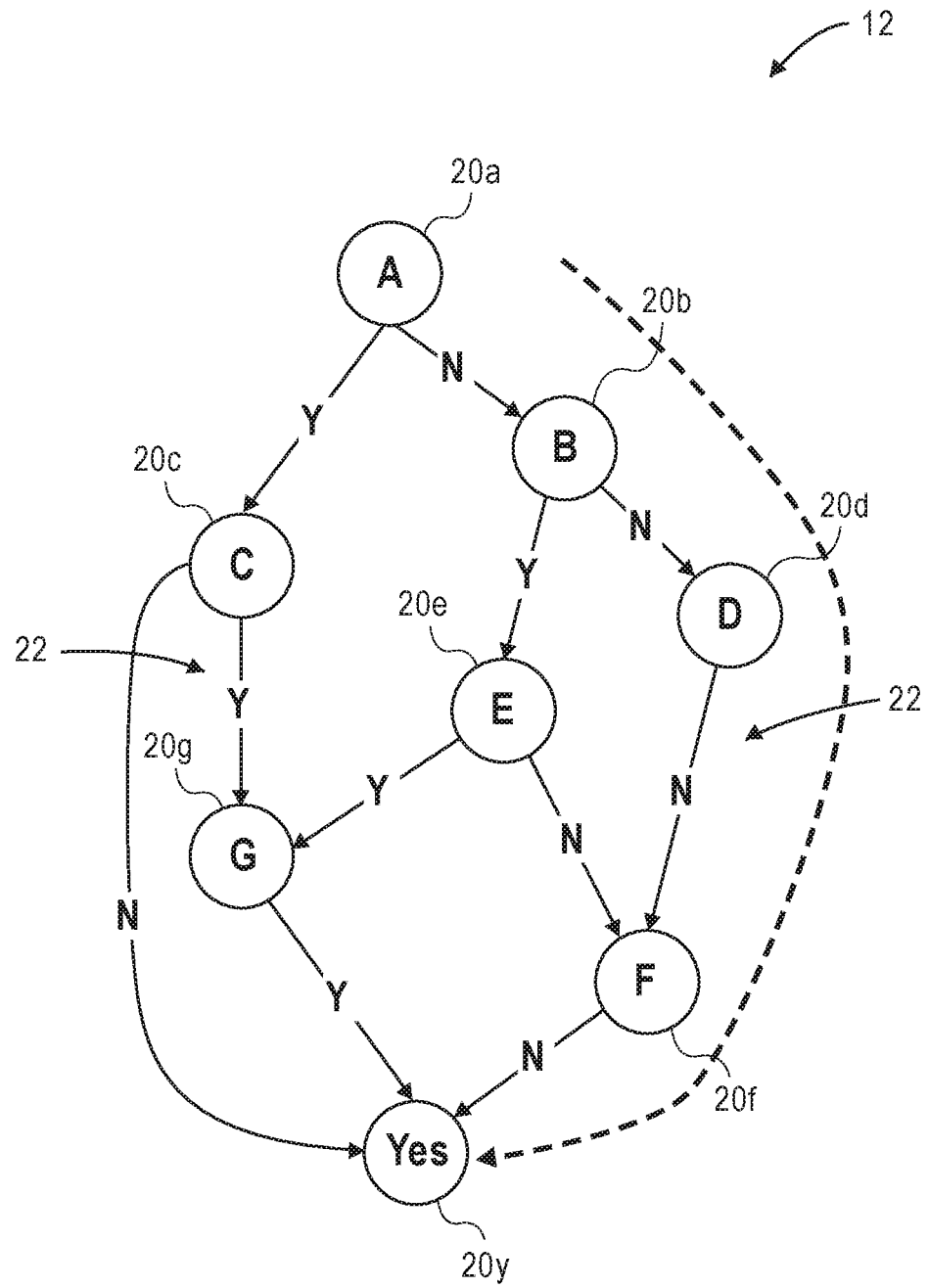
FIG. 12 illustrates another illustration of a completion graph.
Figure 14:
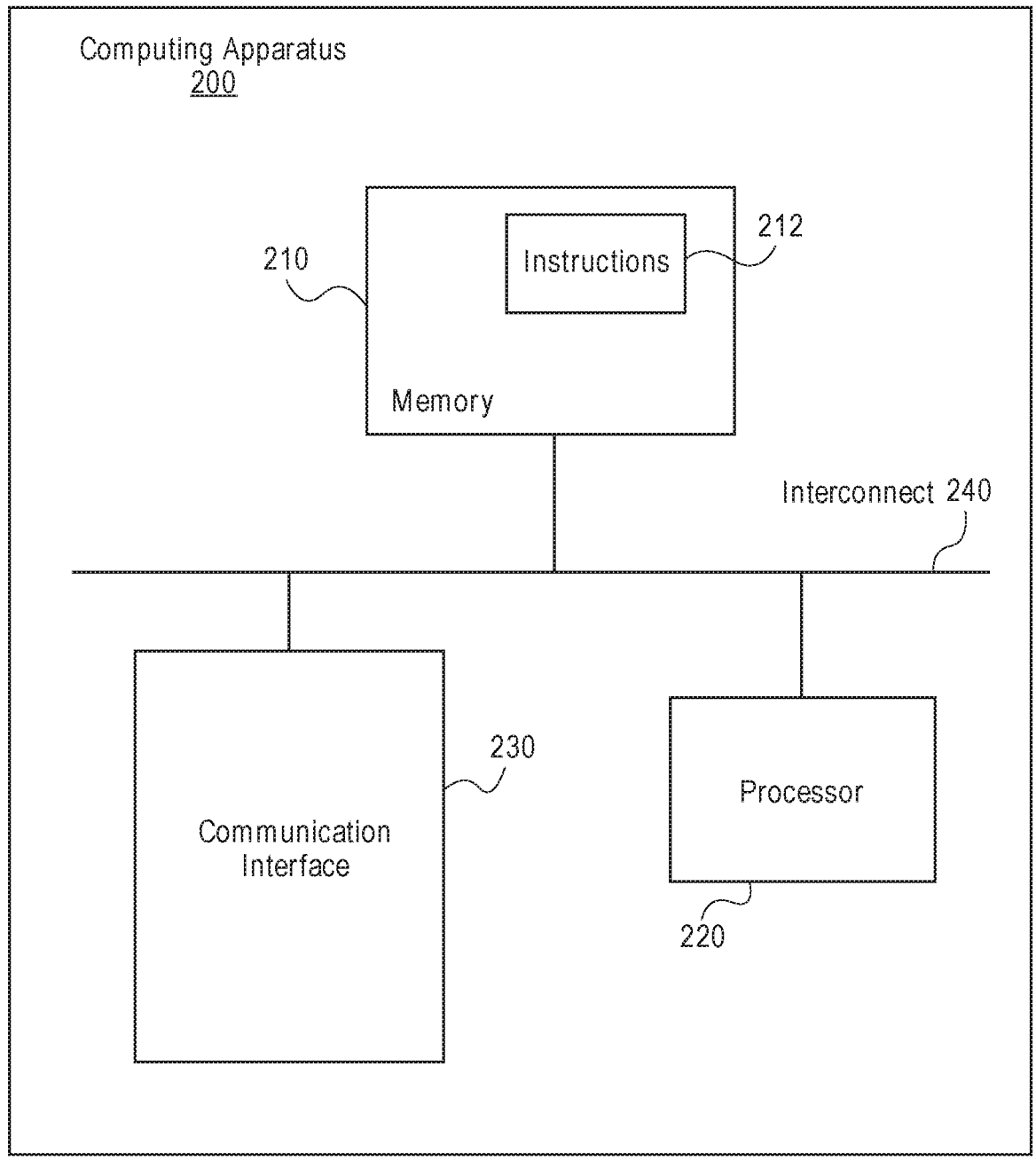
FIG. 14 is a block diagram of a computing apparatus or system in which various embodiments may be implemented or that may be utilized to execute various embodiments.

FIG. 12 illustrates another example of a completion graph 12 that includes a beginning node 20*a* (Node A), intermediate nodes 20*b-g* (Nodes B-G) and a termination node 20*y* (Node "Yes" or "Done"). Each of the beginning node 20*a* and intermediate nodes 20*a-g* represents a question. Inter-node connections or arcs 22 represent response options. In the illustrated embodiment, each inter-node connection 22 represents an answer or response option in binary form (Y/N), for instance, a response to a Boolean expression. It will be understood, however, that completion graphs 12 are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 12 can be traversed through all possible paths from the start node 20*a* to the termination node 20*y*. By navigating various paths through the completion graph 12 in a recursive manner, the system can determine each path from the beginning node 20*a* to the termination node 20*y*. The completion graph 12 along with the pathways to completion through the graph can be converted into a different data structure or format. In the illustrated embodiment shown in FIG. 13, this different data structure or format is in the form of a decision table 30. In the illustrated example, the decision table 30 includes rows 32 (five rows 32*a-e* are illustrated) based on the paths through the completion graph 12. In the illustrated embodiment, the columns 34*a-g* of the completion graph represent expressions for each of the questions (represented as nodes A-G in FIG. 12) and answers derived from completion paths through the completion graph 12 and column 34*h* indicates a conclusion, determination, result or goal 34*h* concerning a tax topic or situation, e.g., "Yes—your child is a qualifying child" or "No—your child is not a qualifying child."

Referring to FIG. 13, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 12 converted into the decision table 30 of FIG. 13, if the first question presented to the user during an interview process is question "A" and the user answers "Yes" rows 32*c-e* may be eliminated from consideration given that no pathway to completion is possible. The tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34*a*, when an answer to QA is "Y" and a path is completed through the completion graph 12 by answering Question C as "N" then answers to the other questions in Nodes B and D-F are "?" since they are not needed to be answered given that particular path.

After in initial question has been presented and rows are eliminated as a result of the selection, next, a collection of candidate questions from the remaining available rows 32*a* and 32*b* is determined. From this universe of candidate questions from the remaining rows, a candidate question is selected. In this case, the candidate questions are questions QC and QG in columns 34*c*, 34*g*, respectively. One of these questions is selected and the process repeats until either the goal 34*h* is reached or there is an empty candidate list.

The query/domain object creator 126 is configured to analyze a node 20 (see FIG. 12) in a portion of a tax return completion graph 12 and assign the node 20 as a property/attribute value of a query object. A query object is a set of questions and conditions that must be answered or satisfied in order to answer a specific tax related question. Continuing with the exemplary tax topic of qualification for a dependent deduction, a possible node 20 (and corresponding property of a query object) is the age of a potential dependent. In some embodiments, the query object creator 126 analyzes each node 20 in a portion of a tax return completion graph 12, and assigns each node 20 as a respective property of a query object.

The natural language synthesis engine 128 is configured to map a property of the query object to a natural language question (i.e., a question that is naturally formed). For instance, a natural language question mapped to node of the age of a potential dependent may be "How old is your daughter?" The natural language synthesis engine 128 utilizes natural language techniques to obtain tax data from users in a friendly way. The natural language questions can be synthetically generated or they can be human authored.

The natural language analysis engine 130 is configured to analyze user input and identify a characteristic (e.g., of the taxpayer, which may be the user) that maps to a property of a query object based on the user input. The natural language analysis engine 130 makes use of human language (e.g., English) constructs such as various equivalent sentence structures, synonyms and antonym to generate matching natural language expressions for communication between a virtual tax agent and a user. Exemplary matching natural language expressions for "yes" include "yeah," "yep," "affirmative," "sure," etc. These matching natural language expressions are used to identify answers/input from the user that map onto properties/attribute values of the query objects.

The runner interface 132 is configured to: (1) modify a query object based on a characteristic (e.g., the characteristic identified by the natural language analysis engine 130); (2) update a tax return completion graph 12 based on the modified query object; (3) and analyze the updated tax return completion graph 12 to determine whether the updated tax return completion graph 12 is complete. Each time the virtual tax agent system 102 detects a change in a query object, the current values are used to modify the node(s) 20 of the tax return completing graph 12. Then, the runner interface 132 analyzes the updated tax return completion graph 12 (including the modified node(s) 20) to determine the completion/outcome of the updated tax return completion graph 12. When the runner interface 132 determines that the outcome is known, the outcome/results are displayed to the user (e.g., using a natural language statement generated by the natural language synthesis engine 128). When the runner interface 132 determines that the query objects are incomplete, the virtual tax agent system 102 generates further natural language queries for the user.

The user interface 134 is configured to communicate with a user, e.g., communicate a natural language question to a user, and/or receive user input from a user. The received user input may be in the form of a natural language statement. Examples of user interfaces 134 include voice and graphic (including text) user interfaces. Voice user interfaces includes a speech synthesizer/analyzer that transforms questions and statement between text and audio formats. An exemplary audio format is the MP3 format.

FIG. 12 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 12 is provided to generally illustrate how embodiments may be configured and implemented. The processors 122 in the server computing device 104 and the user computing device 106 are programmed with respective virtual tax agent system 102, tax return preparation system 110 and web browser program 112 so that they are no longer generic computing devices.

Having described various aspects of virtual tax agent systems 102 according to various embodiments, computer-implemented methods for facilitating user interactions/communication with a tax return preparation program using the virtual tax agent systems 102 will now be described. The methods also include analyzing and modifying a tax return completion graph 12, and generating natural language.

Figure 15:
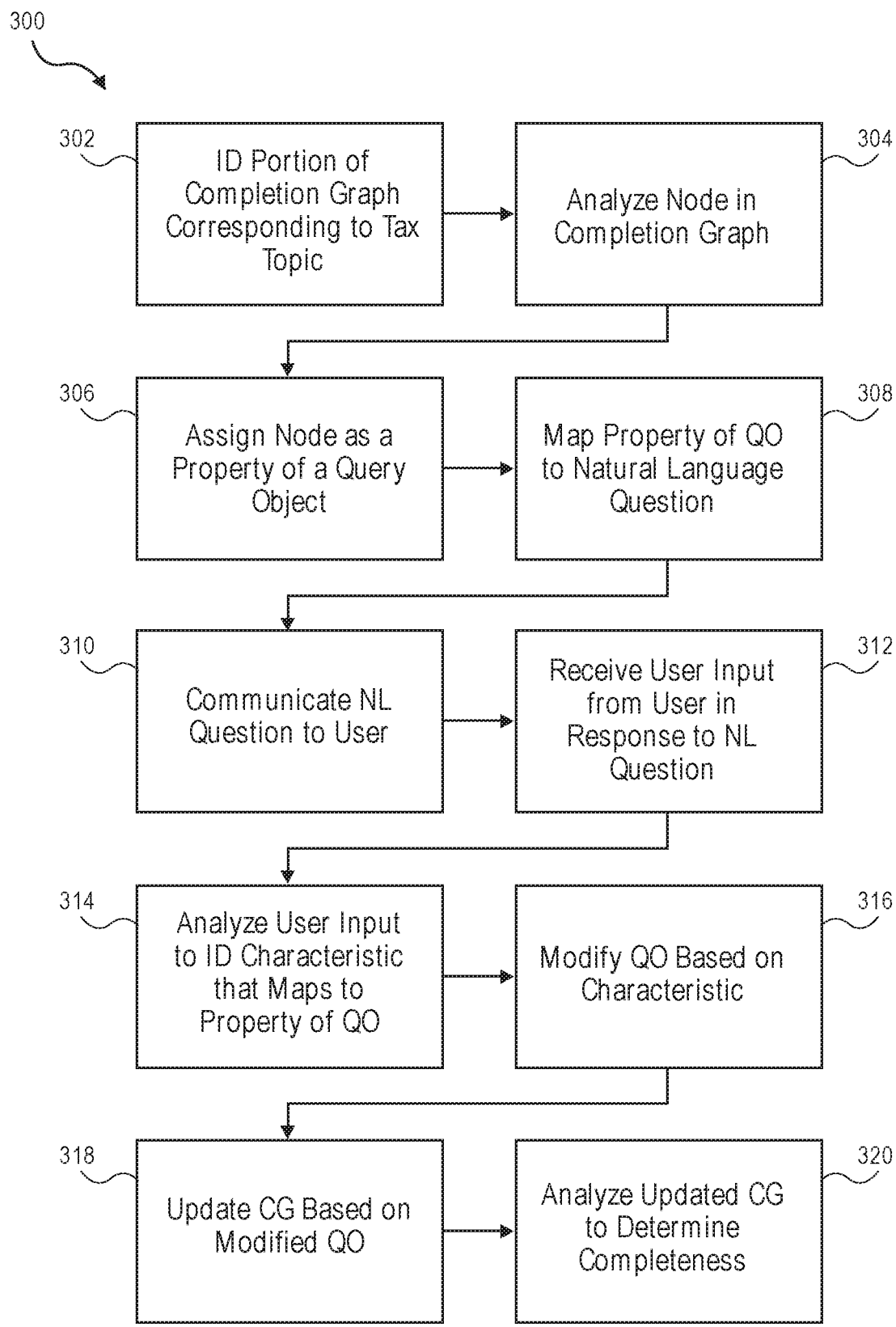
FIG. 15 is a flow chart depicting a computer-implemented method for facilitating user interaction with a tax return preparation program according to one embodiment.

FIG. 15 depicts a computer-implemented method 300 for facilitating user interactions/communication with a tax return preparation program according to one embodiment. The method 300 may be implemented using the virtual tax agent systems 102 running on the hardware systems (e.g., 100) depicted in FIGS. 1-9 and 13.

At step 302, the virtual tax agent system 102 (e.g., the tax completion graph parser 124 identifies a portion of a tax return completion graph corresponding to a tax topic. An example of a tax topic is qualification for a dependent deduction. The tax completion graph parser 124 may have previously acquired the tax return completion graph in its native format and transformed the completion graph format into an internal format for processing. In some embodiments, the tax completion graph parser 124 isolates specific parts of the tax return completion graph related to the tax topic by setting other input/outputs to default values. This allows the tax return completion graph to be run with incomplete information.

At step 304, the virtual tax agent system 102 (e.g., the query/domain object creator 126) analyzes a node 20 (see FIG. 12) in the portion of the tax return completion graph 12. In some embodiments, the query object creator 126 analyzes each node 20 in the portion of the tax return completion graph 12.

At step 306, the virtual tax agent system 102 (e.g., the query/domain object creator 126) assigns the node 20 as a property/attribute value of a query object. Continuing with the exemplary tax topic of qualification for a dependent deduction, a possible node 20 (and corresponding property of a query object) is the age of a potential dependent. In some embodiments, the query object creator 126 assigns each node 20 in the portion of tax return completion graph 12 as a respective property of a query object.

At step 308, the virtual tax agent system 102 (e.g., the natural language synthesis engine 128) maps the property of the query object to a natural language question. For instance, a natural language question mapped to node of the age of a potential dependent may be "How old is your daughter?" The natural language synthesis engine 128 utilizes natural language techniques to obtain tax data from users in a friendly way. The natural language questions can be synthetically generated or they can be human authored.

At steps 310 and 312, a user interface 134, which may be operatively coupled to or a part of the virtual tax agent system 102, communicates the natural language question to the user (step 310) and receives user input from the user in response to the communicating the natural language question. The received user input may be in the form of a natural language statement. Examples of user interfaces 134 include voice and graphic (including text) user interfaces.

At step 314, the virtual tax agent system 102 (e.g., the natural language analysis engine 130) analyzes the user input to identify a characteristic (e.g., of the taxpayer, which may be the user) that maps to the property of the query object based on the user input. The natural language analysis engine 130 makes use of human language (e.g., English) constructs such as various equivalent sentence structures, synonyms and antonym to generate matching natural language expressions for communication between a virtual tax agent and a user. Exemplary matching natural language expressions for "yes" include "yeah," "yep," "affirmative," "sure," etc. These matching natural language expressions are used to identify answers/input from the user that map onto properties/attribute values of the query objects.

At step 316, the virtual tax agent system 102 (e.g., the runner interface 132) modifies the query object based on the characteristic identified by the natural language analysis engine 130. At step 318, the virtual tax agent system 102 (e.g., the runner interface 132) updates the tax return completion graph 12 based on the modified query object. At step 320, the virtual tax agent system 102 (e.g., the runner interface 132) analyzes the updated tax return completion graph 12 to determine whether the updated tax return completion graph 12 is complete. Each time the virtual tax agent system 102 detects a change in a query object, the current values are used to modify the node(s) 20 of the tax return completing graph 12. Then, the runner interface 132 analyzes the updated tax return completion graph 12 (including the modified node(s) 20) to determine the completion/outcome of the updated tax return completion graph 12. When the runner interface 132 determines that the outcome is known, the outcome/results are displayed to the user (e.g., using a natural language statement generated by the natural language synthesis engine 128 and the user interface 134). When the runner interface 132 determines that the query objects are incomplete, the virtual tax agent system 102 generates further natural language queries for the user.

FIGS. 16 to 27 depict various exemplary screenshots displayed on the visual display/screen 114 of various user computing devices 106 in the embodiments described above. The screenshots in FIGS. 16 to 27 depict interactions/communications between a user and a virtual tax agent system 102 running along with a tax return preparation system 110 for the purpose of obtaining tax data to prepare a tax return. The communications relate to a scenario in which a user wants to know whether his son qualifies as a dependent for a dependent deductions on the user's federal tax return.

Figure 16:
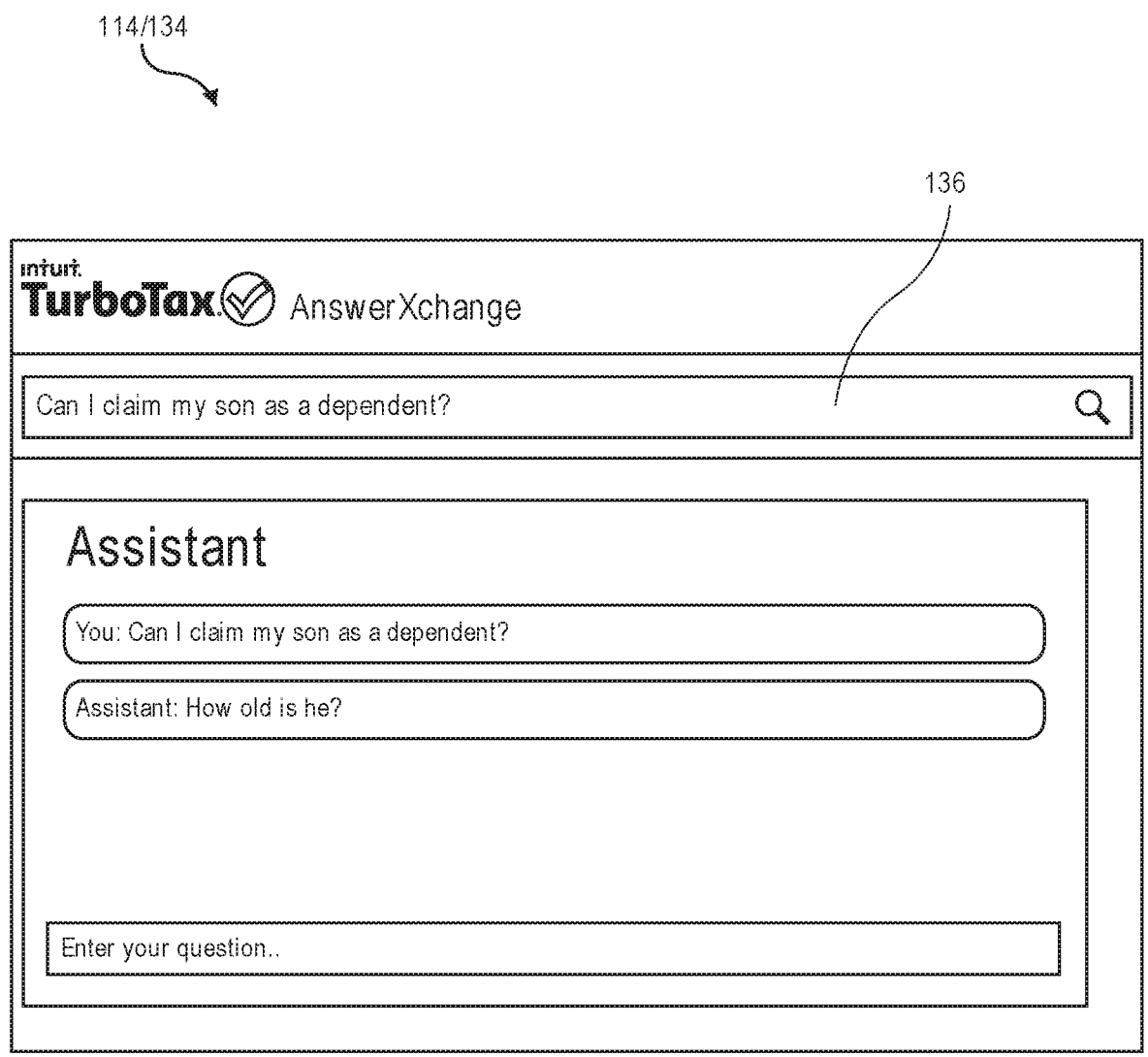
FIGS. 16-27 are various screen shots depicting user interactions with a virtual tax agent system running along with a tax return preparation program according to various embodiments.

In FIG. 16, the user has typed the question "Can I claim my son as a dependent?" into a text box 136 of a graphical/text based user interface 134. Because this is the beginning of a new interaction between the user and the virtual tax agent system 102, the system 102 loads a tax return completion graph 12 (e.g., a TKE completion graph from the tax return preparation system 110) for dependent qualification and creates a query object. The first unknown property/attribute of the query object corresponds to the natural language question "How old is he?" The system 102 displays this question to the user in a natural language format, which improves the user's experience with the system 102.

Figure 17:
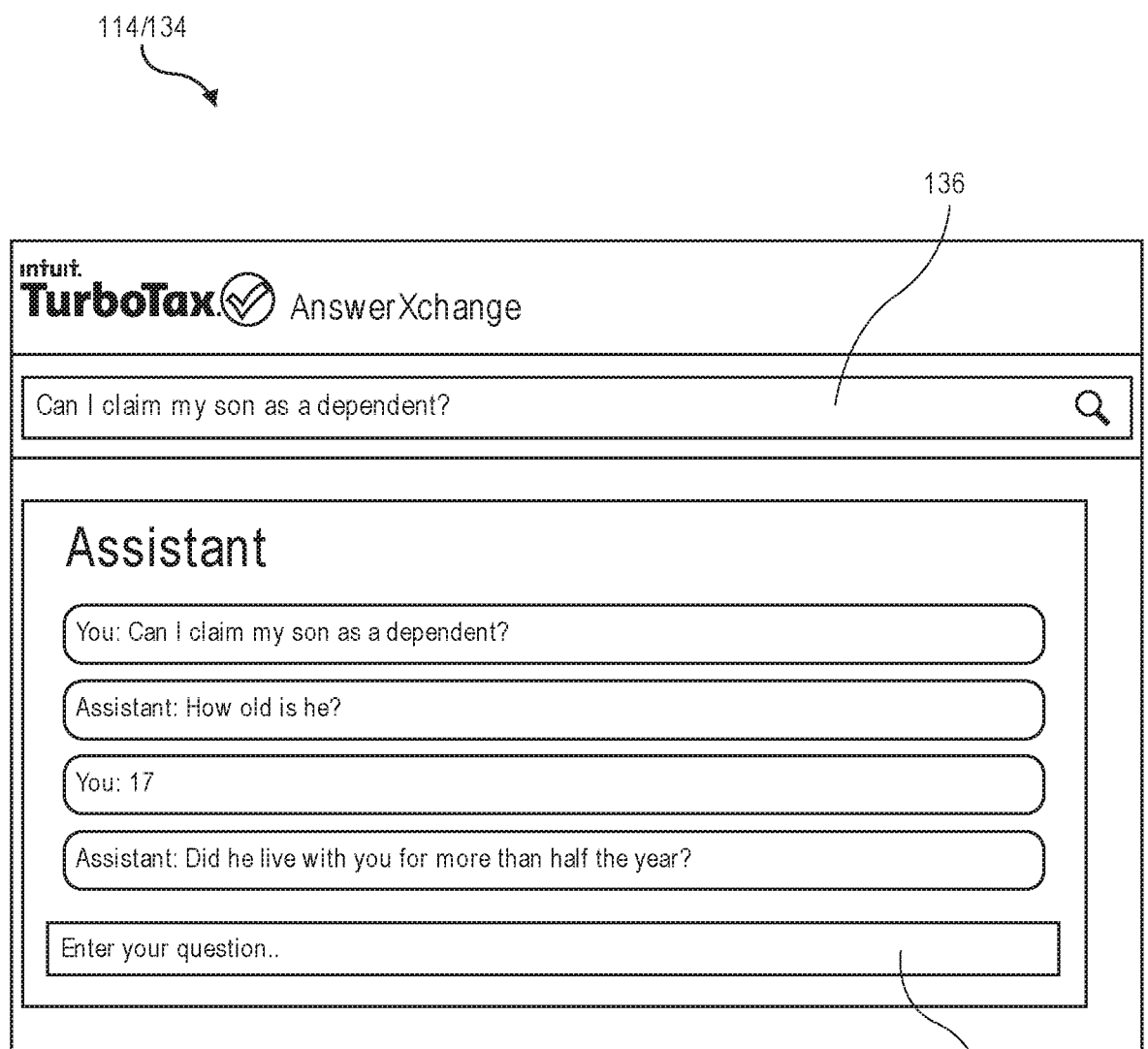

In FIG. 17, the user has answered "17," and the system 102 has displayed a natural language question corresponding to the next unknown property of the query object, i.e., "Did he live with you for more than half the year?"

Figure 18:
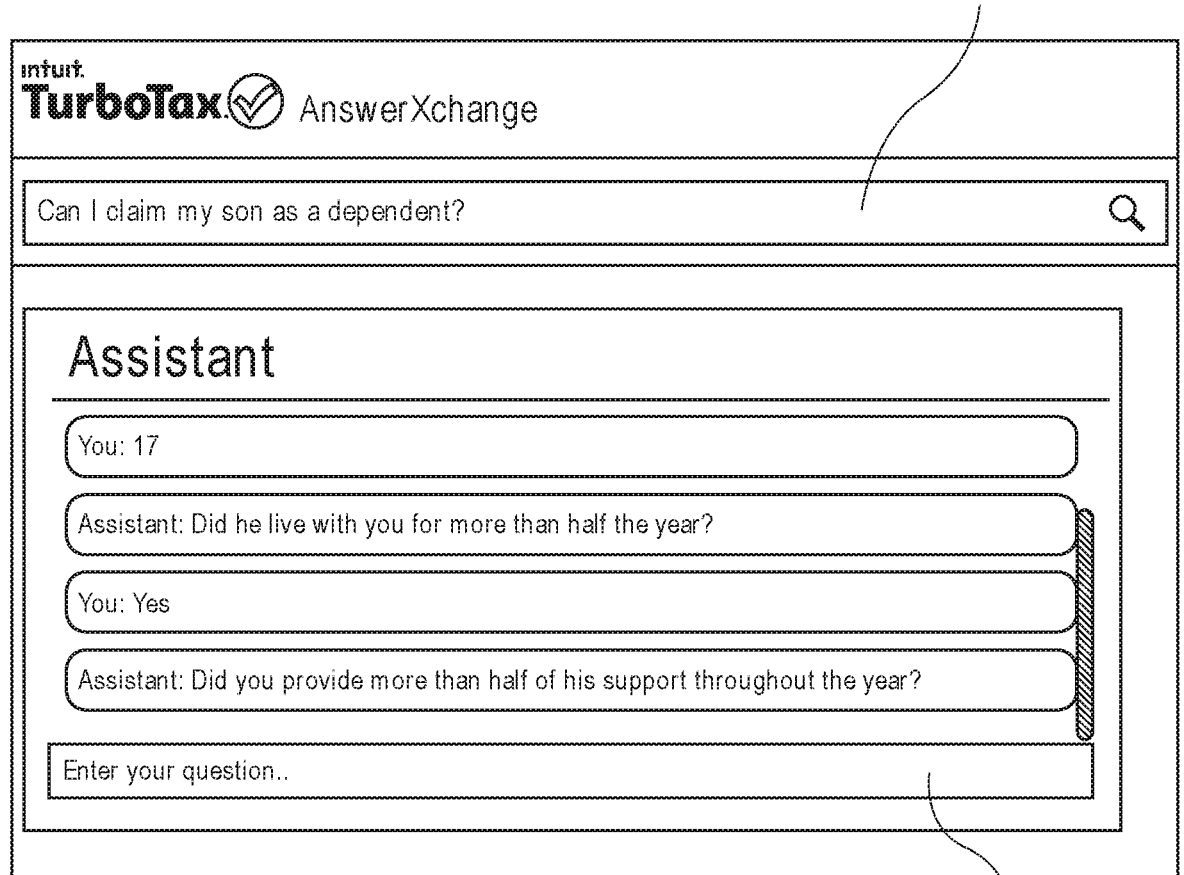

In FIG. 18, the user has answered "Yes," and the system 102 has displayed a natural language question corresponding to the next unknown property of the query object, i.e., "Did you provide more than half of his support throughout the year?"

Figure 19:
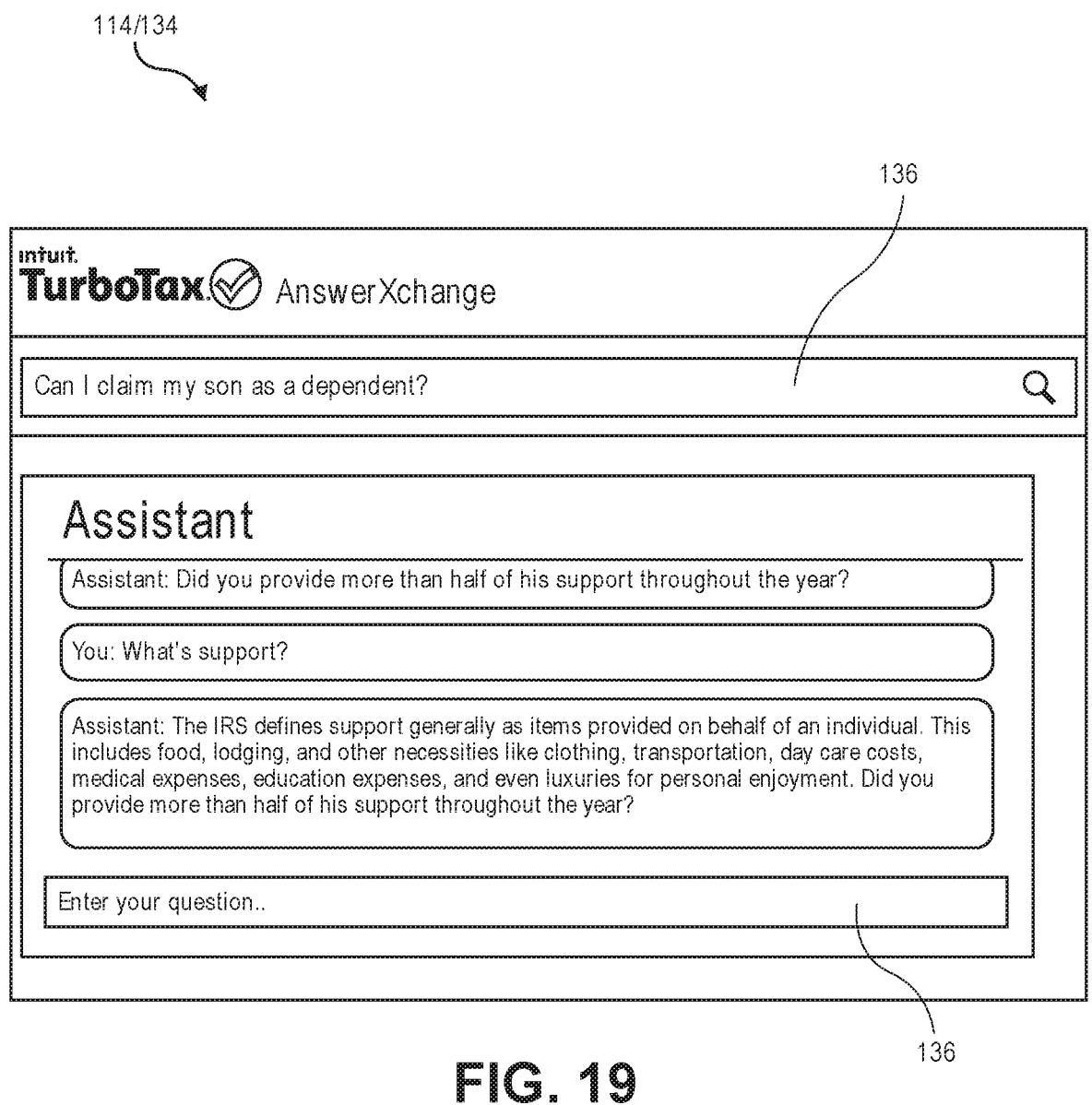

In FIG. 19, the user has asked for an explanation of the last question (i.e., "What's support?"), and the system 102 has displayed the a definition of support and repeated the last question.

Figure 20:
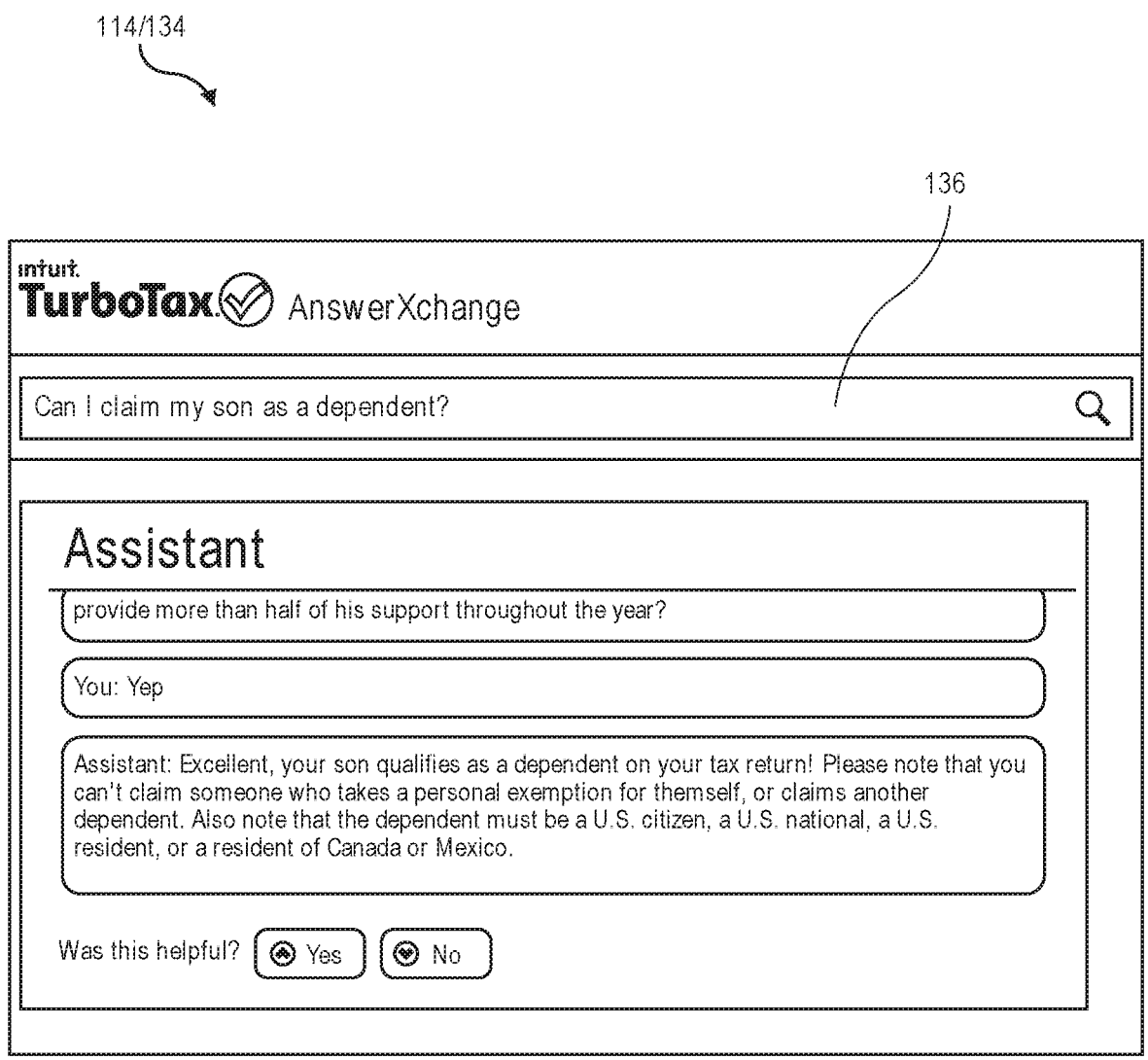

In FIG. 20, the user has answered "Yep" to the last question. Even though the user's answer is a colloquial statement, the system 102 can map the answer to the affirmative using natural language analysis as described above. The system 102 has displayed a message informing the user that their son qualifies as a dependent on the tax return. The system 102 has also displayed certain restrictions relating to the dependent deduction.

Figure 21:
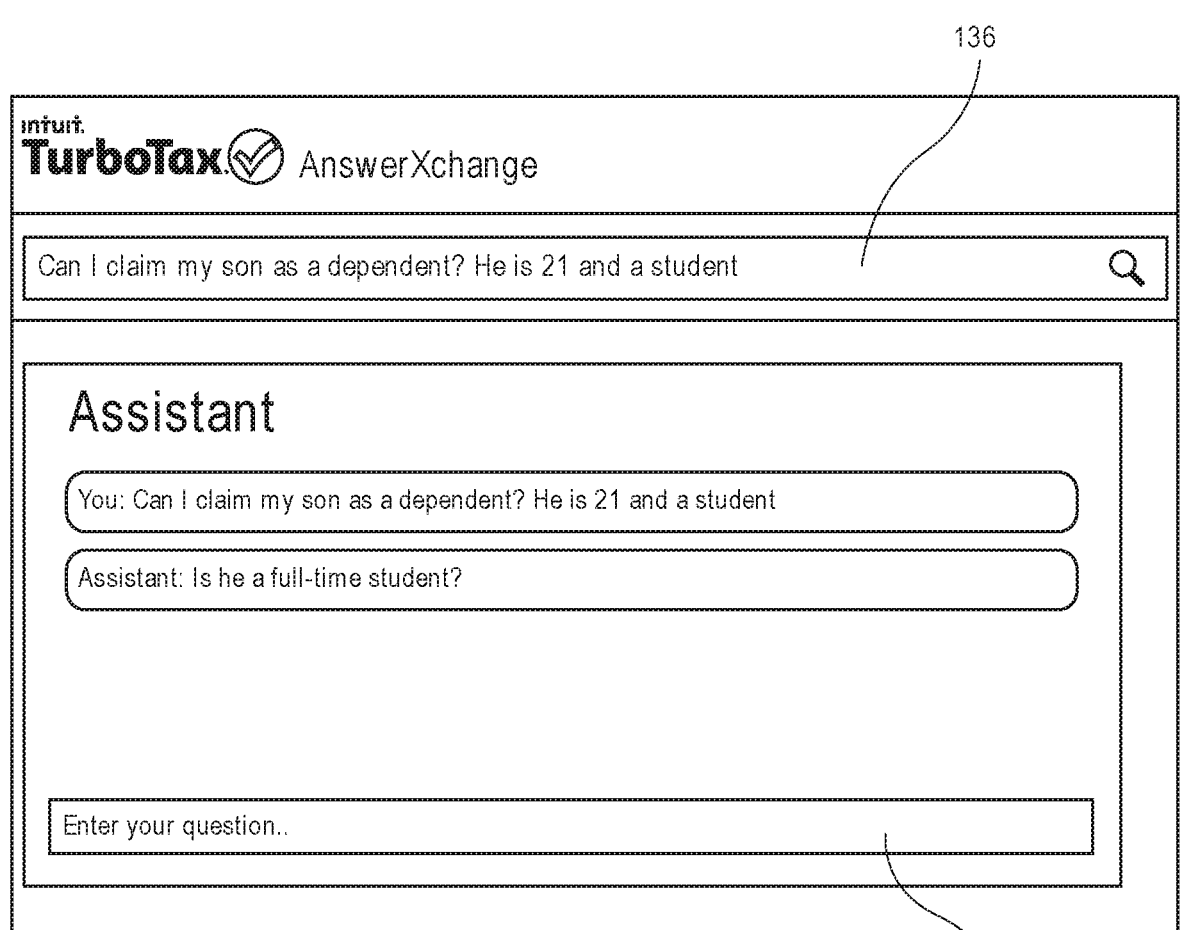

In FIG. 21, the user has typed the question and statement "Can I claim my son as a dependent? He is 21 and a student" into a text box 136 of a graphical/text based user interface 134. Because this is the beginning of a new interaction between the user and the virtual tax agent system 102, the system 102 loads a tax return completion graph 12 (e.g., a TKE completion graph from the tax return preparation system 110) for dependent qualification and creates a query object. The system 102 can parse this question and statement using natural language analysis as described above, and it can fill in the age property of the query object. Based on the "student" information in the user's statement, the system 102 determines that the next unknown property/attribute of the query object corresponds to the natural language question "Is he a full time student?" The system 102 displays this question to the user in a natural language format, which improves the user's experience with the system 102.

Figure 22:
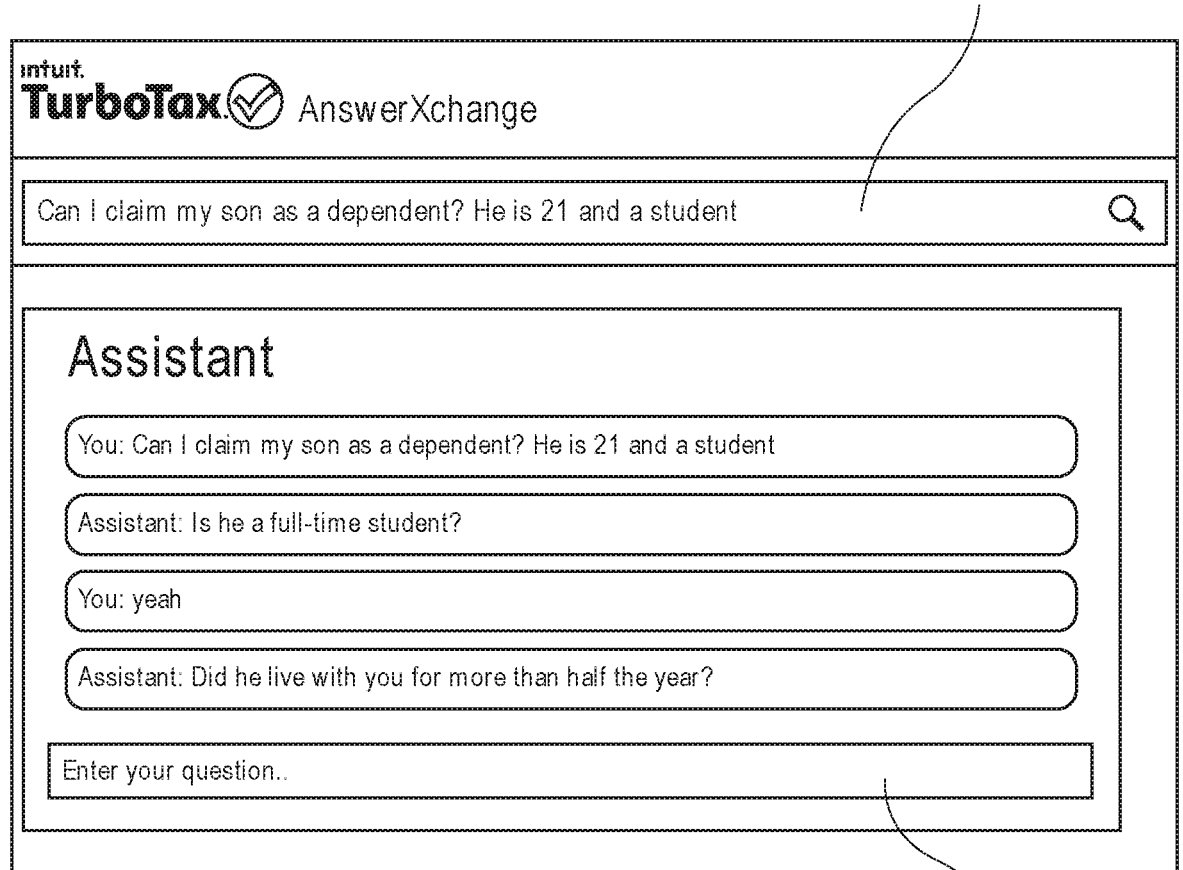

In FIG. 22, the user has answered "yeah." Even though the user's answer is a colloquial statement, the system 102 can map the answer to the affirmative using natural language analysis as described above. The system 102 has displayed a natural language question corresponding to the next unknown property of the query object, i.e., "Did he live with you for more than half the year?"

Figure 23:
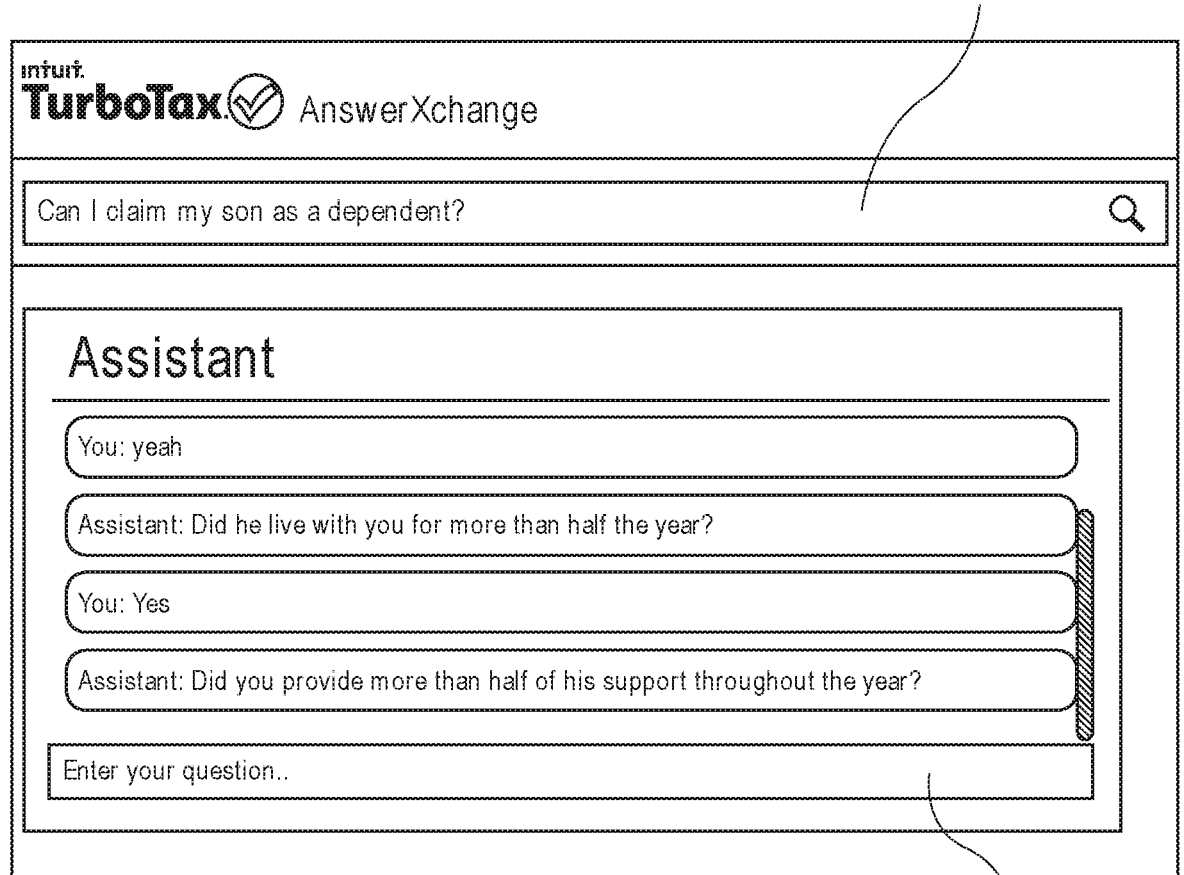

In FIG. 23, the user has answered "yes," and the system 102 has displayed a natural language question corresponding to the next unknown property of the query object, i.e., "Did you provide more than half of his support throughout the year?"

Figure 24:
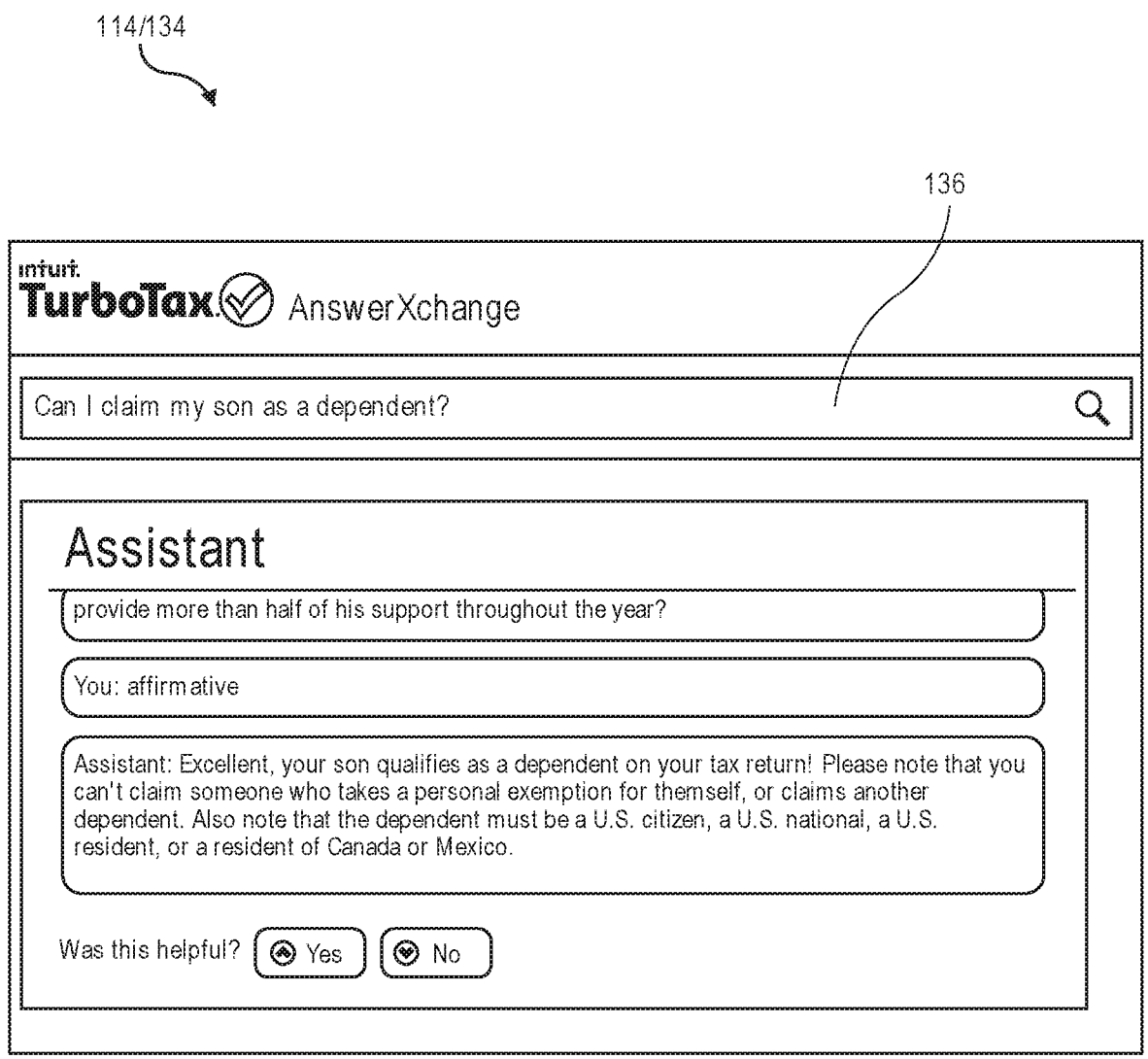

In FIG. 24, the user has answered "affirmative." Even though the user's answer is a colloquial statement, the system 102 can map the answer to the affirmative using natural language analysis as described above. The system 102 has displayed a message informing the user that their son qualifies as a dependent on the tax return. The system 102 has also displayed certain restrictions relating to the dependent deduction.

Figure 25:
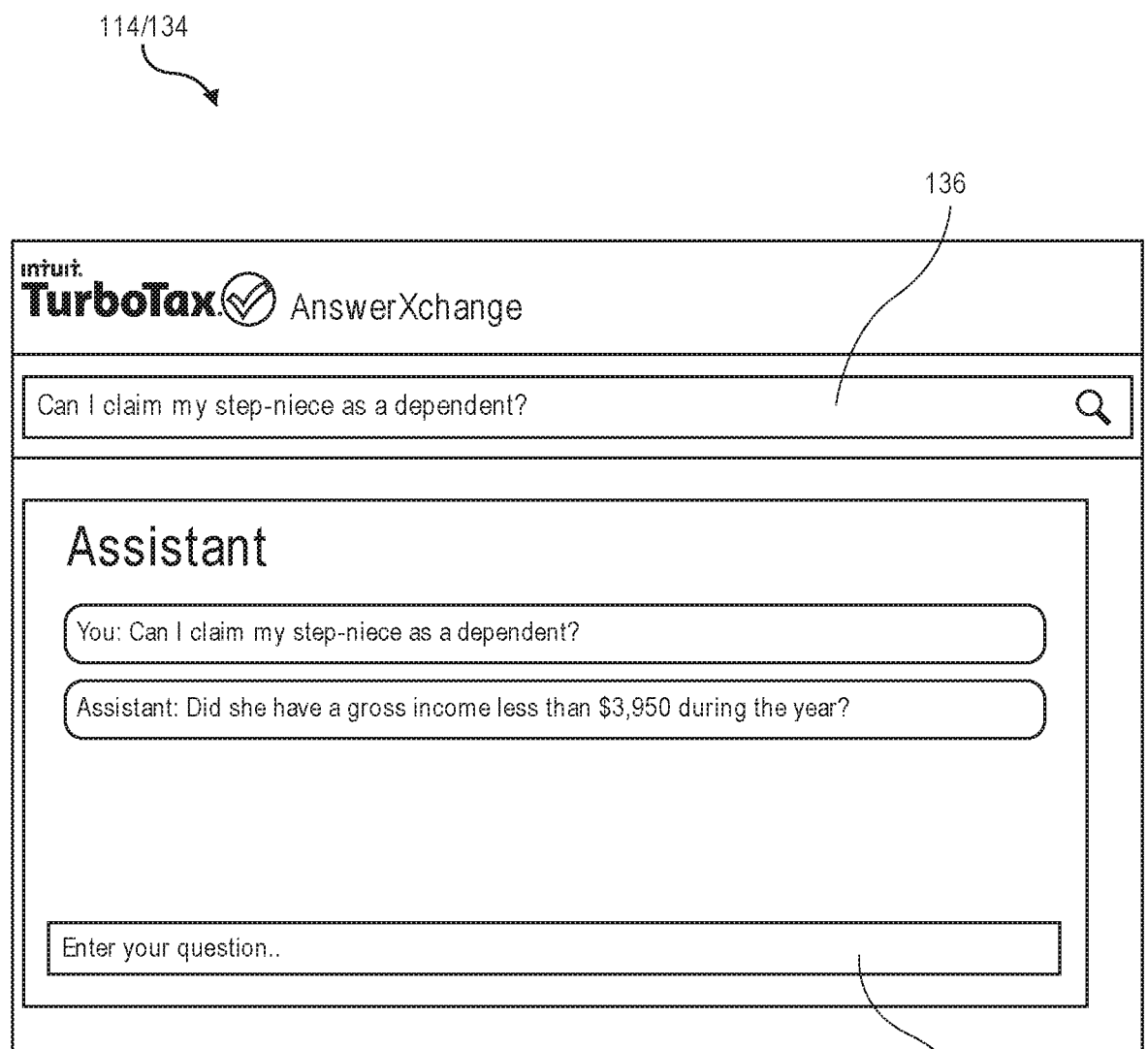

In FIG. 25, the user has typed the question "Can I claim my step-niece as a dependent?" into a text box 136 of a graphical/text based user interface 134. Because this is the beginning of a new interaction between the user and the virtual tax agent system 102, the system 102 loads a tax return completion graph 12 (e.g., a TKE completion graph from the tax return preparation system 110) for dependent qualification and creates a query object. The first unknown property/attribute of the query object corresponds to the natural language question "Did she have a gross income less than $3,500 during the year?" The system 102 displays this question to the user in a natural language format, which improves the user's experience with the system 102.

Figure 26:
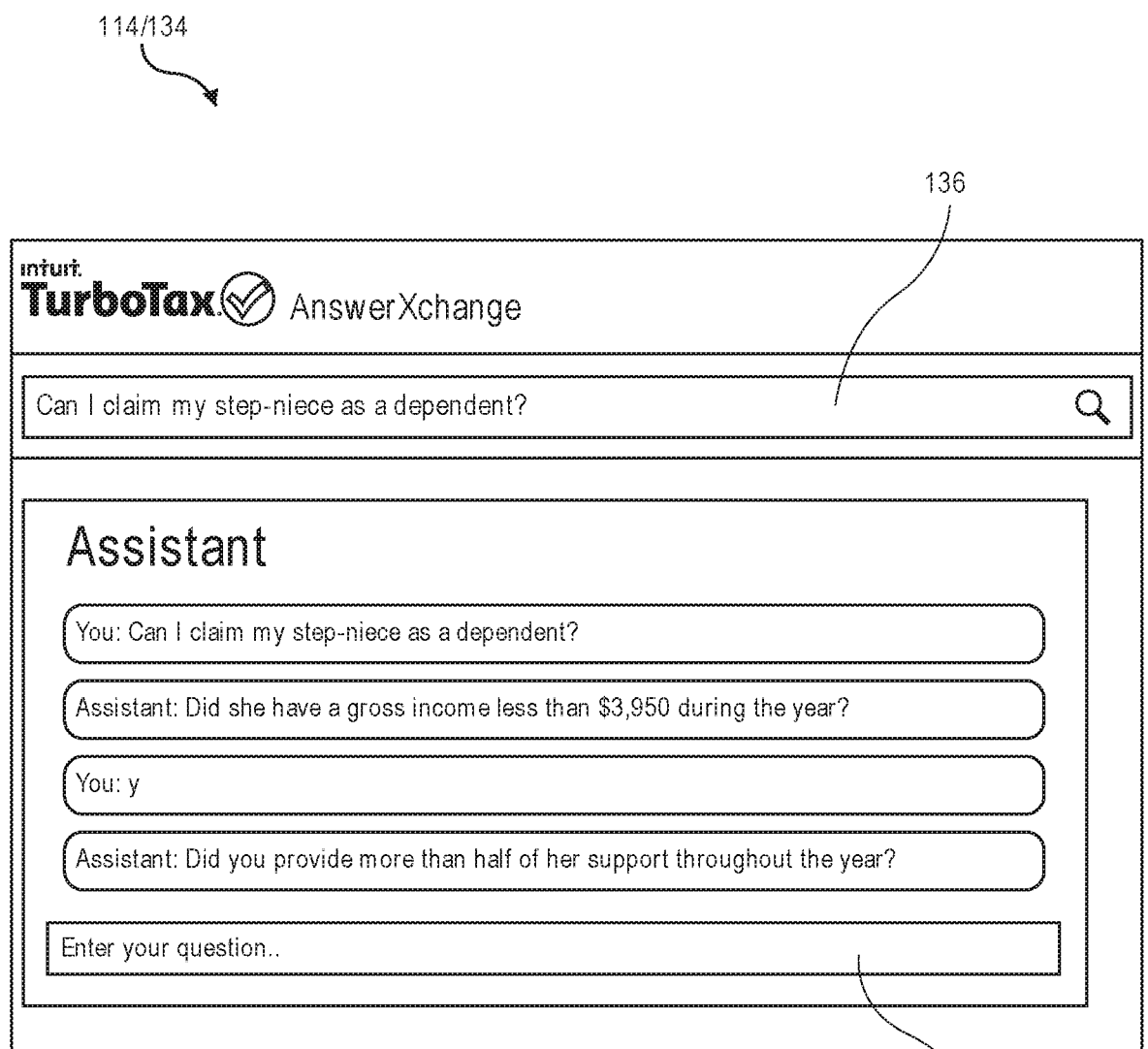

In FIG. 26, the user has answered "y." Even though the user's answer is a colloquial statement, the system 102 can map the answer to the affirmative using natural language analysis as described above. The system 102 has displayed a natural language question corresponding to the next unknown property of the query object, i.e., "Did you provide more than half of her support throughout the year?"

Figure 27:
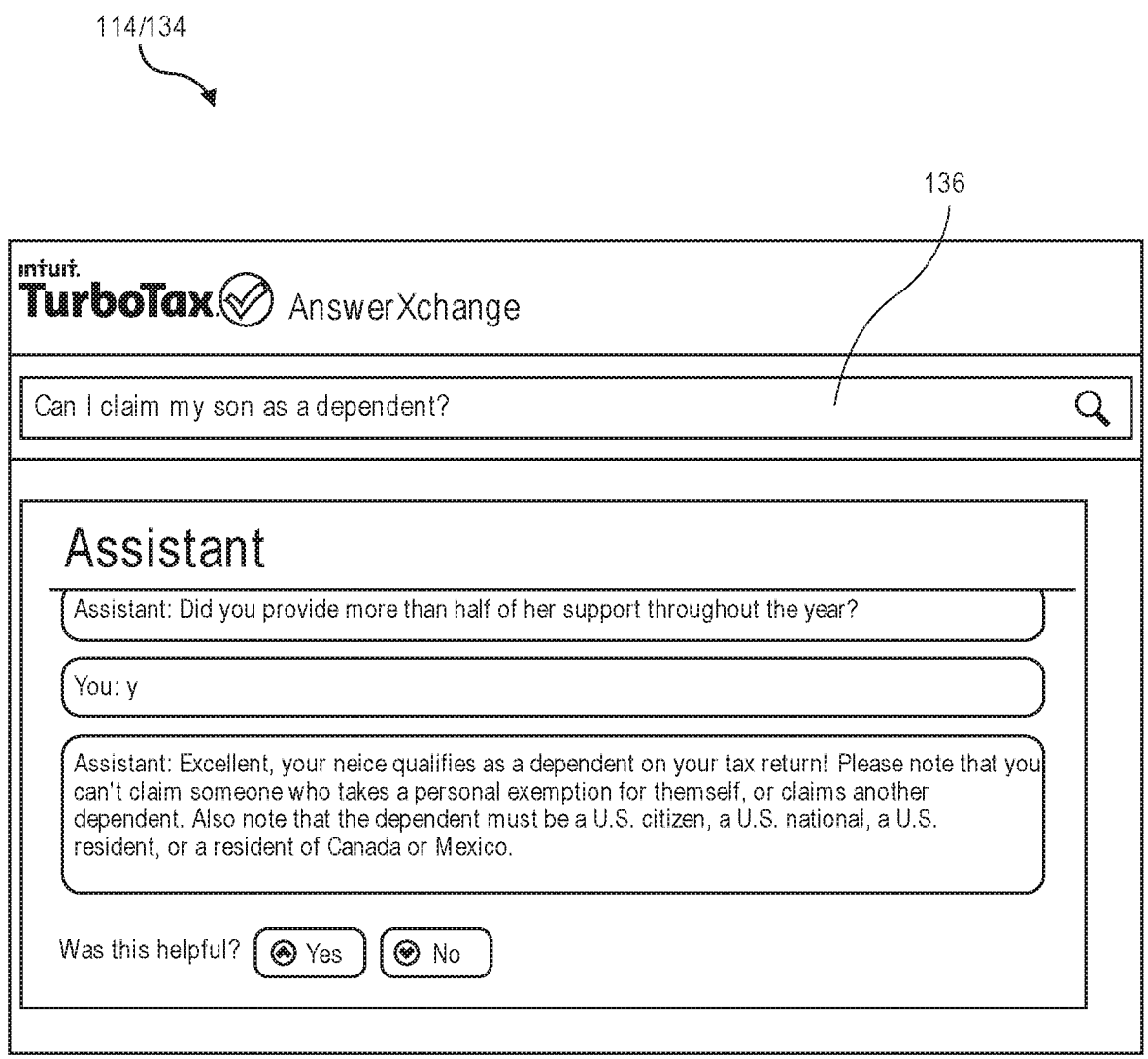

In FIG. 27, the user has answered "y." Even though the user's answer is a colloquial statement, the system 102 can map the answer to the affirmative using natural language analysis as described above. The system 102 has displayed a message informing the user that their son qualifies as a dependent on the tax return. The system 102 has also displayed certain restrictions relating to the dependent deduction.

Although the three exemplary scenarios depicted in FIGS. 16-27 resulted in favorable tax outcomes for the user (dependent allowed), the system 102 will also experience unfavorable tax outcomes. It such scenarios, the system 102 can display natural language statements to the user to reduce the negative impact of the unfavorable tax outcome on the mood of the user. This will improve the overall user experience.

Although the three exemplary scenarios depicted in FIGS. 16-27 resulted in an definite answer for the user's tax question, the system 102 will also experience scenarios where it will not be able to answer a user's tax questions (e.g., due to lack of tax knowledge or inability to parse user questions and answers). In such scenarios, the system 102 can connect the user with a human customer service representative to provide further assistance. The system 102 can also provide a summary of the user/system interactions so far to the human customer service representative to guide their discussions with the user and to prevent duplicative questions. This will also improve the over user experience.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

For example, while certain embodiments have been described with reference to simplified completion graph analysis and natural language analysis, completion graphs and natural language constructs can be substantially more complex such that more complicated analyses can be utilized therewith. Completion graph analysis is not available in known virtual agents.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A system for implementing a virtual tax agent to facilitate user interaction with a tax return preparation program, comprising:
    a completion graph parser executed on a computing device and being configured to identify one or more nodes of a tax return completion graph corresponding to a tax topic;
    a query object creator executed on the computing device and being configured to analyze a first node from the one or more nodes and to assign the first node as a first property of a query object related to the tax topic;
    a natural language synthesis engine executed on the computing device and being configured to map the first property of the query object related to the tax topic to a first natural language question;
    a natural language analysis engine executed on the computing device and being configured to analyze user input and to identify a characteristic of the user that maps to the first property of the query object related to the tax topic based on the user input; and
    a runner interface executed on the computing device and being configured to modify the query object related to the tax topic based on the characteristic of the user, update the tax return completion graph based on the modified query object,
        analyze the updated tax return completion graph to determine whether the updated tax return completion graph is complete,
        map a result of the updated tax return completion graph to a natural language statement when the runner interface determines the updated tax return completion graph is complete; and instruct the user interface to communicate the natural language statement to the user when the runner interface determines the updated tax return completion graph is complete.

2. The system of claim 1, wherein the completion graph parser is configured to reformat the tax return completion graph.

3. The system of claim 1, wherein the completion graph parser is configured to assign a default value to additional one or more nodes of the tax return completion graph not corresponding to the tax topic.

4. The system of claim 1, wherein the first property of the query object related to the tax topic must be determined to answer a question related to the tax topic.

5. The system of claim 1, wherein the natural language synthesis engine is configured to generate the first natural language question based on the first property of the query object related to the tax topic.

6. The system of claim 1, wherein the first natural language question was previously generated.

7. The system of claim 1, wherein the user interface is a voice user interface.

8. The system of claim 1, wherein the user interface is a graphic user interface.

9. The system of claim 1, wherein the natural language analysis engine comprises a natural language construct.

10. The system of claim 9, wherein the natural language construct is selected from the group consisting of an equivalent sentence structure, a synonym, and an antonym.

11. The system of claim 9, wherein the natural language analysis engine is configured to analyze the user input using the natural language construct.

12. The system of claim 1, wherein the runner interface is configured to analyze the updated tax return completion graph to determine whether the updated tax return completion graph is complete in response to the natural language analysis engine identifying the characteristic that maps to the first property of the query object related to the tax topic.

13. The system of claim 1, wherein the runner interface is configured to:
   instruct the query object creator to generate a second property of the query object related to the tax topic based on the node; and
   instruct the natural language synthesis engine to map the second property of the query object to a second natural language question when the runner interface determines the updated tax return completion graph is incomplete.

14. The system of claim 13, wherein the runner interface is configured to instruct the user interface to communicate the second natural language question to the user when the runner interface determines the updated tax return completion graph is incomplete.

15. The system of claim 1, further comprising a user interface configured to communicate the first natural language question to a user and to receive the user input from the user in response to communicating the first natural language question.

16. A computer-implemented method for implementing a virtual tax agent to facilitate user interaction with a tax return preparation program, the method comprising:
   identifying, by a completion graph parser executed on a computing device, one or more nodes of a tax return completion graph corresponding to a tax topic;
   analyzing, by a query object creator executed on the computing device, a first node from the one or more nodes;
   assigning, by the query object creator, the first node as a first property of a query object related to the tax topic;
   mapping, by a natural language synthesis engine executed on the computing device, the first property of the query object related to the tax topic to a first natural language question;
   communicating the first natural language question to a user;
   receiving, by a natural language analysis engine executed on the computing device, user input from the user in response to communicating the first natural language question;
   analyzing, by a natural language analysis engine, the user input to identify a characteristic that maps to the first property of the query object related to the tax topic based on the user input;
   modifying, by a runner interface executed on the computing device, the query object related to the tax topic based on the characteristic of the user;
   updating the tax return completion graph based on the modified query object;
   analyzing the updated tax return completion graph to determine whether the updated tax return completion graph is complete,
   mapping a result of the updated tax return completion graph to a natural language statement when the runner interface determines the updated tax return completion graph is complete; and
   instructing the user interface to communicate the natural language statement to the user when the runner interface determines the updated tax return completion graph is complete.

17. The method of claim 16, further comprising reformatting the tax return completion graph.

18. The method of claim 16, further comprising assigning a default value to additional one or more nodes of the tax return completion graph not corresponding to the tax topic.

19. The method of claim 16, wherein the first property of the query object related to the tax topic must be determined to answer a question related to the tax topic.

20. The method of claim 16, further comprising generating the first natural language question based on the first property of the query object related to the tax topic.

21. The method of claim 16, wherein the first natural language question was previously generated.

22. The method of claim 16, further comprising analyzing the user input using a natural language construct.

23. The method of claim 22, wherein the natural language construct is selected from the group consisting of an equivalent sentence structure, a synonym, and an antonym.

24. The method of claim 16, further comprising analyzing the updated tax return completion graph to determine whether the updated tax return completion graph is complete in response to identifying the characteristic that maps to the first property of the query object related to the tax topic.

25. The method of claim 16, further comprising:
   generating a second property of the query object related to the tax topic based on the node; and
   mapping the second property of the query object related to the tax topic to a second natural language question when it is determined that the updated tax return completion graph is incomplete.

26. The method of claim 25, further comprising communicating the second natural language question to the user when it is determined that the updated tax return completion graph is incomplete.

27. A computer program product comprising a non-transitory computer readable storage medium embodying one or more instructions executable by a computer system to perform a process for implementing a virtual tax agent to facilitate user interaction with a tax return preparation program, the process comprising identifying, by a completion graph parser executed on a computing device, one or more nodes of a tax return completion graph corresponding to a tax topic, analyzing, by a query object creator executed on the computing device, a first node from the one or more nodes graph, assigning the first node as a first property of a query object related to the tax topic, mapping, by a natural language synthesis engine executed on the computing device, the first property of the query object related to the tax topic to a first natural language question, communicating the first natural language question to a user, receiving, by a natural language analysis engine executed on the computing device, user input from the user in response to communicating the first natural language question, analyzing, by a natural language analysis engine, the user input to identify a characteristic that maps to the first property of the query object related to the tax topic based on the user input, modifying, by a runner interface executed on the computing device, the query object related to the tax topic the query object related to the tax topic based on the characteristic of the user, updating the tax return completion graph based on the modified query object, analyzing the updated tax return completion graph to determine whether the updated tax return completion graph is complete, mapping a result of the updated tax return completion graph to a natural language statement when the runner interface determines the updated tax return completion graph is complete; and instructing the user interface to communicate the natural language statement to the user when the runner interface determines the updated tax return completion graph is complete.

* * * * *